United States Patent
Yoshida et al.

[11] Patent Number: 6,005,596
[45] Date of Patent: Dec. 21, 1999

[54] METHOD FOR RECORDING COLOR IMAGE, APPARATUS FOR RECORDING COLOR IMAGE, AND METHOD FOR CONTROLLING RECORDING OF COLOR IMAGE

[75] Inventors: Masaaki Yoshida; Tomoaki Kasugaya; Shoji Naramoto; Masafumi Kobayashi; Norio Takahashi, all of Chiba, Japan

[73] Assignee: Seiko Instruments Information Devices Inc., Japan

[21] Appl. No.: 08/926,893

[22] Filed: Sep. 10, 1997

[30] Foreign Application Priority Data

Oct. 4, 1996 [JP] Japan .................................. 8-264631

[51] Int. Cl.$^6$ .................................................. H04N 1/40
[52] U.S. Cl. ............................................. 347/176; 347/41
[58] Field of Search .................................... 347/172, 183, 347/186, 188, 193, 176, 41; 400/120.07, 120.09; 358/298, 533; 346/46

[56] References Cited

U.S. PATENT DOCUMENTS

| | | | |
|---|---|---|---|
| 4,562,443 | 12/1985 | Matsuno et al. | 347/176 |
| 4,884,080 | 11/1989 | Hirahara et al. | 346/46 |
| 5,696,542 | 12/1997 | Matsubara et al. | 347/12 |
| 5,734,410 | 3/1998 | Sadaki | 347/176 |
| 5,786,900 | 7/1998 | Sawano | 358/298 |

*Primary Examiner*—N. Le
*Assistant Examiner*—Anh T. N. Vo
*Attorney, Agent, or Firm*—Adams & Wilks

[57] ABSTRACT

To suppress color moire in a color image recording apparatus, a method for recording a color image by forming record dots of at least first through third colors on a recording medium in a plurality of lines of record dots each extending in a main scan direction and a plurality of rows of record dots each extending in a sub-scan direction, includes the step of forming the record dots of first through third colors with a different disposition pattern effective to avoid the occurrence of color moire. In a preferred embodiment, the disposition pattern of the record dots of one of the three colors comprises an ordinary zigzag printing pattern in which selected ones of the record dots in each line of record dots are shifted in the sub-scan direction by a uniform amount, the disposition pattern of the record dots of another one of the three colors comprises a modified ordinary zigzag pattern in which a dot pitch between lines of record dots in the sub-scan direction is a non-integer multiple of the dot pitch of the ordinary zigzag printing pattern, and the disposition pattern of the remaining one of the three colors comprises a modified ordinary zigzag pattern in which corresponding record dots in adjacent lines of record dots are closer to each other than are the record dots in adjacent rows.

38 Claims, 21 Drawing Sheets

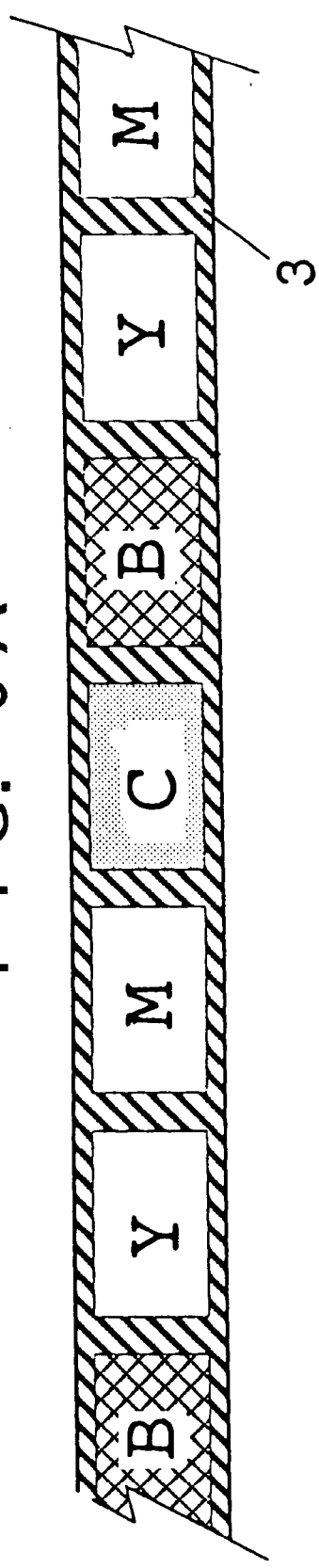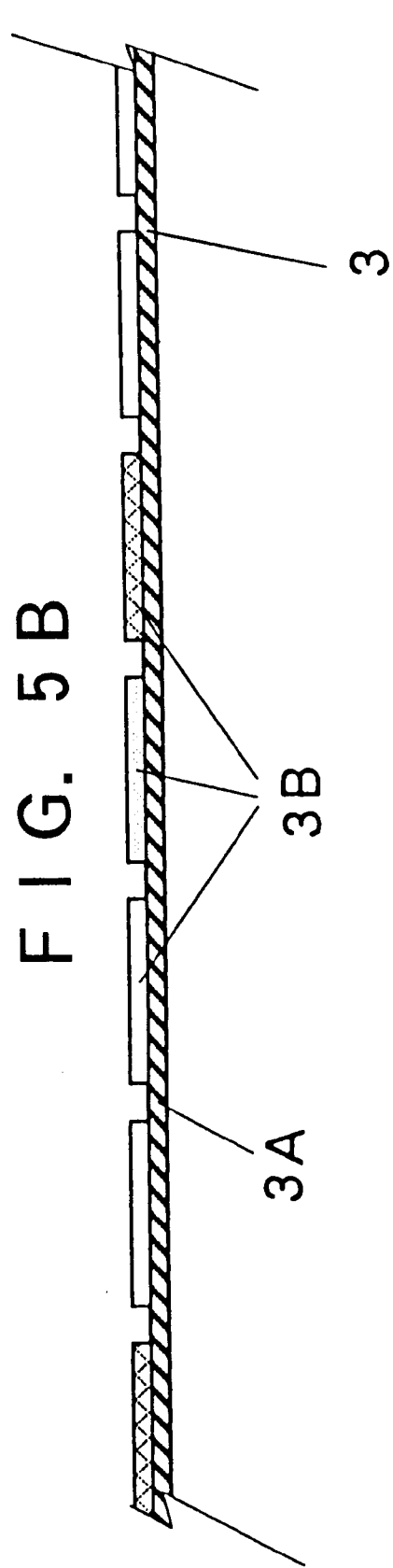
F I G. 5A
F I G. 5B

FIG. 7 before conversion

| 0th line a0 |
| 1st line a1 |
| 2nd line a2 |
| 3rd line a3 |
| 4th line a4 |
| 5th line a5 |
| 6th line a6 |
| 7th line a7 |
| 8th line a8 |

after conversion

| $0.25 \times a0 + 0.75 \times a1$ |
| $0.25 \times a2 + 0.75 \times a1$ |
| $0.25 \times a1 + 0.75 \times a2$ |
| $0.25 \times a3 + 0.75 \times a2$ |
| $0.25 \times a2 + 0.75 \times a3$ |
| $0.25 \times a4 + 0.75 \times a3$ |
| $0.25 \times a3 + 0.75 \times a4$ |
| $0.25 \times a5 + 0.75 \times a4$ |
| $0.25 \times a4 + 0.75 \times a5$ |
| $0.25 \times a6 + 0.75 \times a5$ |
| $0.25 \times a5 + 0.75 \times a6$ |
| $0.25 \times a7 + 0.75 \times a6$ |
| $0.25 \times a6 + 0.75 \times a7$ |
| $0.25 \times a8 + 0.75 \times a7$ |
| $0.25 \times a7 + 0.75 \times a8$ |
| $0.25 \times a9 + 0.75 \times a8$ |

FIG. 8
before conversion
| 0th line a0 |
| 1st line a1 |
| 2nd line a2 |
| 3rd line a3 |
| 4th line a4 |
| 5th line a5 |
| 6th line a6 |
| 7th line a7 |
| 8th line a8 |
after conversion
| 0.25×a0+0.75×a1 |
| 0.5×a1+0.5×a2 |
| 0.25×a3+0.75×a2 |
| 0.25×a2+0.75×a3 |
| 0.5×a3+0.5×a4 |
| 0.25×a5+0.75×a4 |
| 0.25×a4+0.75×a5 |
| 0.5×a5+0.5×a6 |
| 0.25×a7+0.75×a6 |
| 0.25×a6+0.75×a7 |
| 0.5×a7+0.5×a8 |
| 0.25×a9+0.75×a8 |

F I G. 9A 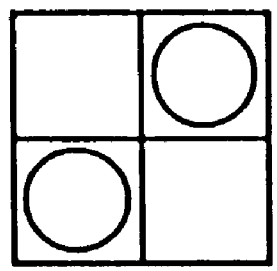
F I G. 9B 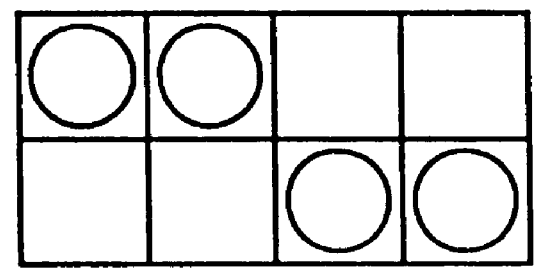
F I G. 9C 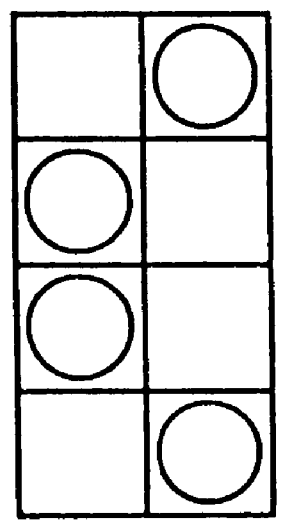

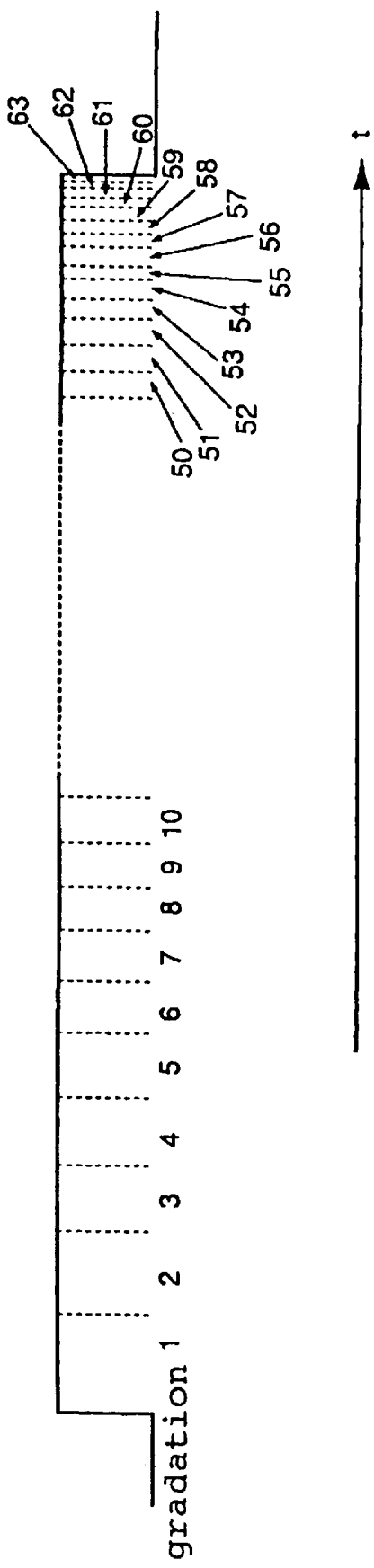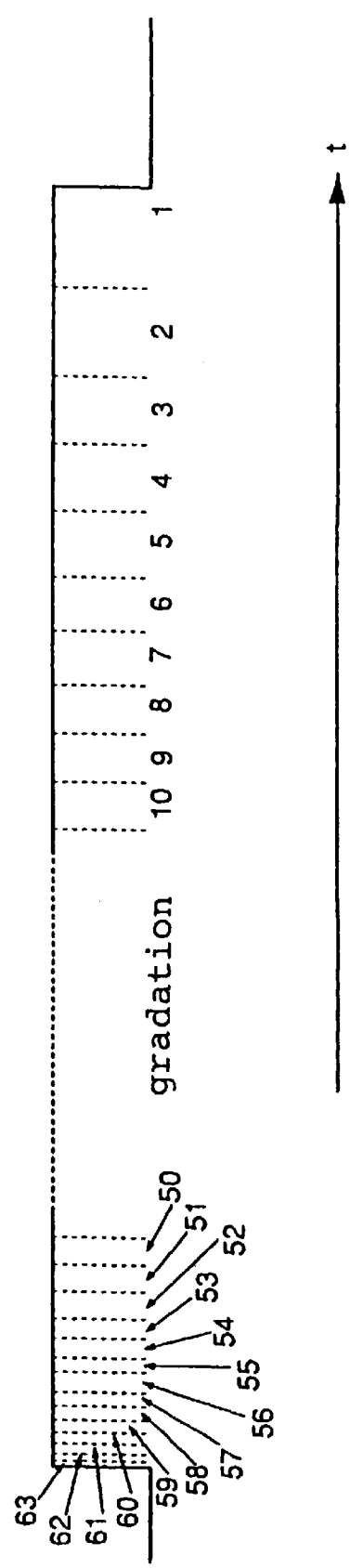

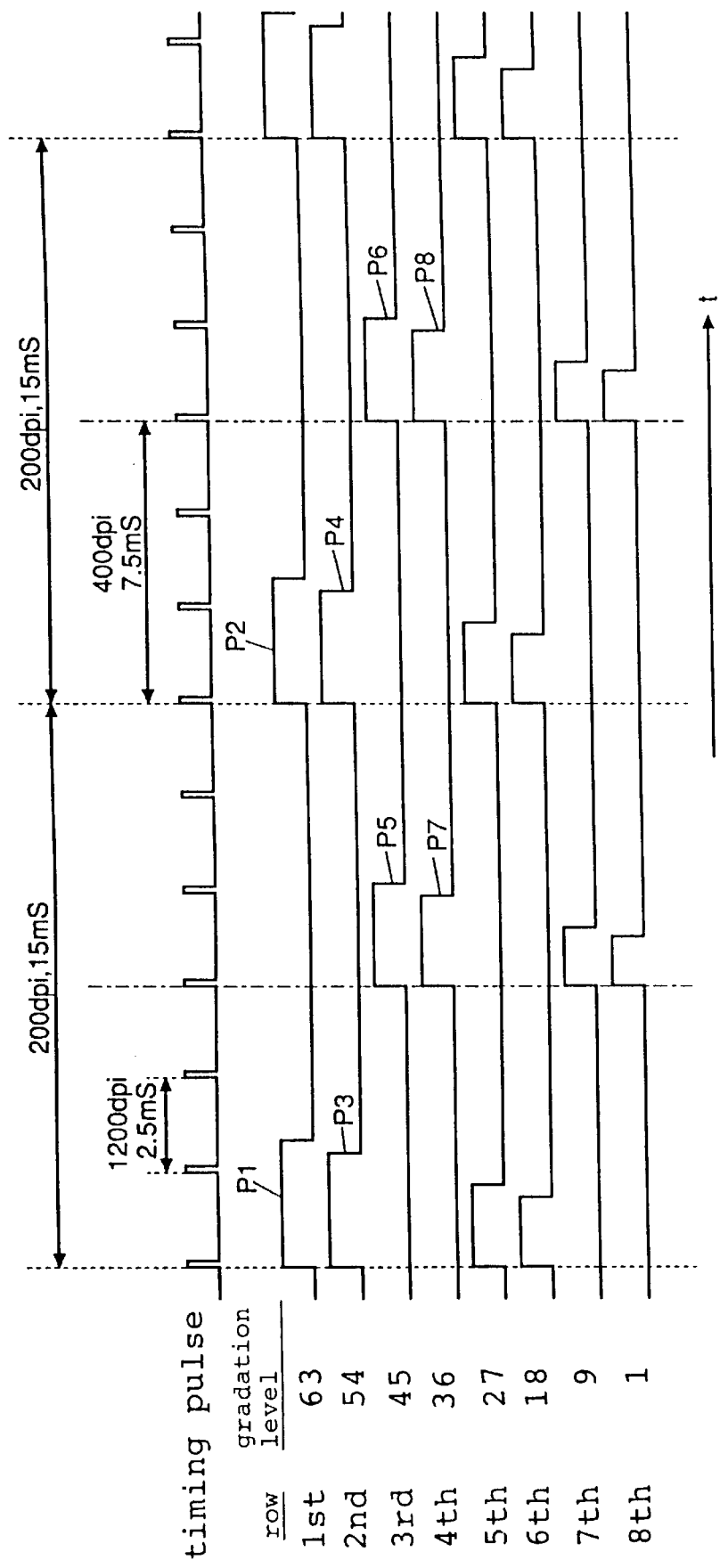

METHOD FOR RECORDING COLOR IMAGE, APPARATUS FOR RECORDING COLOR IMAGE, AND METHOD FOR CONTROLLING RECORDING OF COLOR IMAGE

FIELD OF THE INVENTION

The present invention relates to a method and an apparatus for recording a color image that is arranged to form the record dots of at least three colors on a recording medium and, more particularly, to a technique for suppressing the occurrence of moiré.

BACKGROUND OF THE INVENTION

As an apparatus for recording a color image that has been arranged to form the record dots of at least three colors on a recording medium, there is known a melt type color thermal transfer recording apparatus. In the melt type color thermal transfer recording apparatus, there is used an ink sheet on which there are longitudinally coated heat-meltable inks that have respectively three colors of yellow ("Y" hereinafter), magenta ("M" hereinafter), cyan ("C" hereinafter) or four colors having these colors and a color of black ("K" hereinafter) added thereto in this order. And, this ink sheet and a transfer paper are superposed one over the other and heat is applied from a thermal head to the ink sheet to thereby melt the ink and thereby transfer "Y", "M" and "C", or "Y", "M", "C" and "K", to the transfer paper in this order. The thermal head is equipped with a large number of heat generating elements that have been disposed in the form of a line in the main scan direction. By controlling the time width in which current is applied to these heat generating elements, it is possible to control the area of the record dot to be transferred onto the transfer paper and thereby express the gradation sequence.

FIG. 19 illustrates an example of the disposition pattern of the record dots that have been formed on the transfer paper through the operation of a conventional melt type color thermal transfer recording apparatus. This pattern is one wherein the record dots of each of four colors of "Y", "M", "C" and "K" are formed at 300 dpi (dot pitch ≈84.7 μm) in each of the main scan and sub-scan directions. Further, by shifting the record dots in each line every other row in the sub-scan direction by ½ (≈42.3 μm) of the dot pitch, the heat of the thermal head is diffused to thereby enable the formation of excellent record dots. In this specification, shifting of the record dots in each line every other row in the sub-scan direction in this way is called "one-dot zigzag printing".

FIG. 20 illustrates an example of the timing of pulses which are applied to an energization control switch of the thermal head when realizing the above-mentioned print pattern. It is to be noted that since in this figure for the convenience of not only illustrating the timing for realizing the print pattern such as that illustrated in FIG. 19 but also illustrating the gradation level concurrently, with the gradation in the first row being set to be 63 under the assumption that the maximum gradation level is 63, the gradation levels in the second row and thereafter succeeding rows are made to become gradually lower, it does not result that the areas of the record dots formed by this current correspond to those illustrated in FIG. 19.

As illustrated in FIG. 20, in either the odd row that stands in an odd number of order or the even row that stands in an even number of order, application of current is started in units of 10 msec and this application is stopped after the lapse of a time period that corresponds to the gradation level. And, a time difference of 5.0 msec is provided between the timing for starting the application of current in a line in an odd-order row and the timing for starting the application of current in the line in an even-order row. This timing is determined by being synchronized with a timing pulse that is generated in units of 2.5 msec. It is to be noted that this timing pulse is also synchronized with the timing for driving a stepping motor for conveying the transfer paper. Here, vertical broken lines that have been drawn commonly to all rows in units of 300 dpi/10 msec are reference lines that have been drawn at equal intervals from the print starting timing.

In a case where the resolution as viewed in the sub-scan direction is 300 dpi as illustrated in FIG. 19, it is ideal to dispose the record dots accurately at pitches of 84.7 μm in the sub-scan direction. However, so long as the ink sheet and transfer paper are respectively mechanically conveyed using stepping motors, it is at present extremely difficult to dispose the record dots with the positions thereof being not departed even 1 μm from each other over an entire recording region of every transfer paper. Accordingly, it is actually unavoidable that the departures are made somewhat (several μm to several tens of μm) from the regular positions in the sub-scan direction. In addition, these departures occur at random between each color or between adjacent prints generally with some extent of widths (several mm to several tens of mm) as viewed in the sub-scan direction. FIG. 21 illustrates an example of a disposition pattern of record dots where there exist portions at which "C" departs relatively from "Y" and "M".

In a case where the record dots have been relatively departed in this way, even when each of "Y", "M" and "C" has been printed at a gradation of 50%, the color on the transfer paper does not become a uniform half-tone gray. The reason for this is because by the record dots of a given color being relatively departed from the record dots of another color in the sub-scan direction the hue that is seen with the naked eyes undesirably changes with the result that hue streaks (also called "color moiré") occur. Further, the fact that a difference in respect of the transferability (the ink concentration with respect to the energy) exists between where ink is transferred directly onto the transfer paper and where ink is applied onto the ink of another color also promotes the occurrence of the color moiré.

SUMMARY OF THE INVENTION

The present invention has been made under the above-mentioned actual circumstances and has an object to suppress the color moiré effectively in an apparatus for recording a color image that is arranged to form the record dots of at least three colors.

A method and apparatus for recording a color image according to the present invention are a method and apparatus for recording a color image which are arranged to form the record dots of at least three colors on a recording medium, and are characterized in that the record dots of a first color are formed so that the disposition pitch thereof as viewed in a sub-scan direction may become a non-integral multiple of the disposition pitch of the record dots formed by ordinary zigzag printing; the record dots of a second color are formed with respect to the record dots formed by ordinary zigzag printing at positions that are to be taken by the record dots in either one of an odd line and an adjacent even line being made near to the recording dots in the other thereof; and the record dots of a third color are formed differently from those of the first color and the second color.

Here, the ordinary zigzag printing is a mode of printing in which the record dots in each line are periodically shifted with prescribed regularity by a prescribed distance in the sub-scan direction and the interval between each line, i.e., the pitch of the record dots between adjacent lines in each row is made to be fixed. For example, in the case of a one-dot zigzag printing illustrated in FIG. 19, the record dots in each line are shifted by ½ (≈42.3 μm) of the dot pitch every second row in the sub-scan direction and the interval between each line is made to be at a fixed value of 84.7 μm. The ordinary zigzag printing, as referred to in the present invention also includes patterns that are obtained by modifying the pattern of FIG. 19 as follows and patterns that are obtained by combining the following patterns. First, a pattern that is obtained by setting the distance by which the record dots are shifted in the sub-scan direction to be at a value other than ½ of the dot pitch, e.g., ¼ thereof. Next, patterns that are obtained by shifting, instead of shifting record dots in each line every second row, two record dots in each line every second two rows (two-dot zigzag printing), and three record dots in each line every second three rows (three-dot zigzag printing) Also, patterns that are obtained by shifting every three rows in each line the preceding or succeeding one record dot therein and by shifting every five rows in each line the preceding or succeeding two record dots therein. Further, patterns that are obtained by making the dot pitch as viewed in the sub-scan direction longer or shorter than that as viewed in the main scan direction.

Forming the record dots of a second color with respect to the record dots formed by ordinary zigzag printing at positions that are to be taken by the record dots in either one of an odd line and an adjacent even line being made near to the record dots in the other thereof can be realized by shifting with respect to the ordinary zigzag printing the timing for applying energy to the recording element in order to form the record dots in an odd line or an adjacent even line. For example, in a case where the recording element is a heat generating element, such forming can be realized by shifting the timing for energizing the heat generating element within a time period in which the recording medium is conveyed by the extent corresponding to one line.

Also, making the disposition pitch of the record dots of one color as viewed in the sub-scan direction become a non-integral multiple of the disposition pitch of the record dots formed by the ordinary zigzag printing can be realized by setting the frequency of energization within a time period in which the recording medium is conveyed a prescribed distance to be a frequency which is different from the frequency which is set when the ordinary zigzag printing is performed according to a value which corresponds to the non-integral multiple.

According to the present invention, a first color is formed so that the disposition pitch of the record dots thereof as viewed in the sub-scan direction is a non-integral multiple of the disposition pitch of record dots formed by ordinary zigzag printing. For this reason, among the first color, a second color and the remaining colors including the colors printed by the ordinary zigzag printing, since the record dots of the respective colors are departed from each other at random, the occurrence of color moiré is suppressed.

Also, according to the present invention, since the record dots of a second color are formed with respect to the record dots formed by the ordinary zigzag printing at positions that are to be taken by the record dots in either one of an odd line or an adjacent even line being made near to the record dots in the other thereof, it is almost impossible that the record dots of the a second color and the record dots of the other colors are superposed one over the other with the same configuration. That is, although the departure itself between the recording dots of the a second color and the record dots of the other colors occurs somewhat regularly, the hue change as seen macroscopically (with the naked eyes) is suppressed because such departure is relative departure, in which the portions where the record dots are otherwise superposed one over the other cease to be superposed and the portions in the vicinity thereof where the record dots are otherwise not superposed come to be superposed; conversely the portions where the record dots are otherwise not superposed come to be superposed and the portions in the vicinity thereof where the record dots are otherwise superposed cease to be superposed; and even when the superposition that is otherwise small becomes large, the superposition in the vicinity thereof that is otherwise large becomes small.

Further, in the present invention, when the record dots of a color having a high resolution in the sub-scan direction are formed earlier, since the high-resolution record dots are disposed undermost and the low-resolution record dots are disposed thereon, there is a decreased probability that the low-resolution record dots are disposed at interspace positions between the adjacent high-resolution record dots without largely contacting with the record dots of the color located thereunder. Therefore, it is possible to prevent the decrease in the stability of transfer (image quality) that results from the printing performed at the interspace positions. At this time, it is possible to make the decrease in the stability of transfer (image quality) less prominent by printing under the "M" and "C" with respect to which the human eye has a high sensitivity and resolving power.

BRIEF DESCRIPTION OF THE DRAWINGS

FIGS. 5A–5B are a view illustrating the construction of an ink sheet.

FIG. 7 is a view illustrating a calculation for performing from 300 dpi to 600 dpi conversion in a resolution converting portion of FIG. 6.

FIG. 8 is a view illustrating a calculation for performing from 300 dpi to 400 dpi conversion in the resolution converting portion of FIG. 6.

FIGS. 9A–9C are a view illustrating mask patterns that are used in a mask processing portion of FIG. 6.

FIGS. 10A–10B are a view illustrating strobing pules that are generated from a strobing pulse generating portion of FIG. 6.

FIG. 11 is a view illustrating an example of pulses that are applied to a transistor of FIG. 6 when forming "Y" record dots.

DETAILED DESCRIPTION OF THE
PREFERRED EMBODIMENTS

An embodiment of the present invention will now be explained in detail with reference to the drawings.

Figure 1:
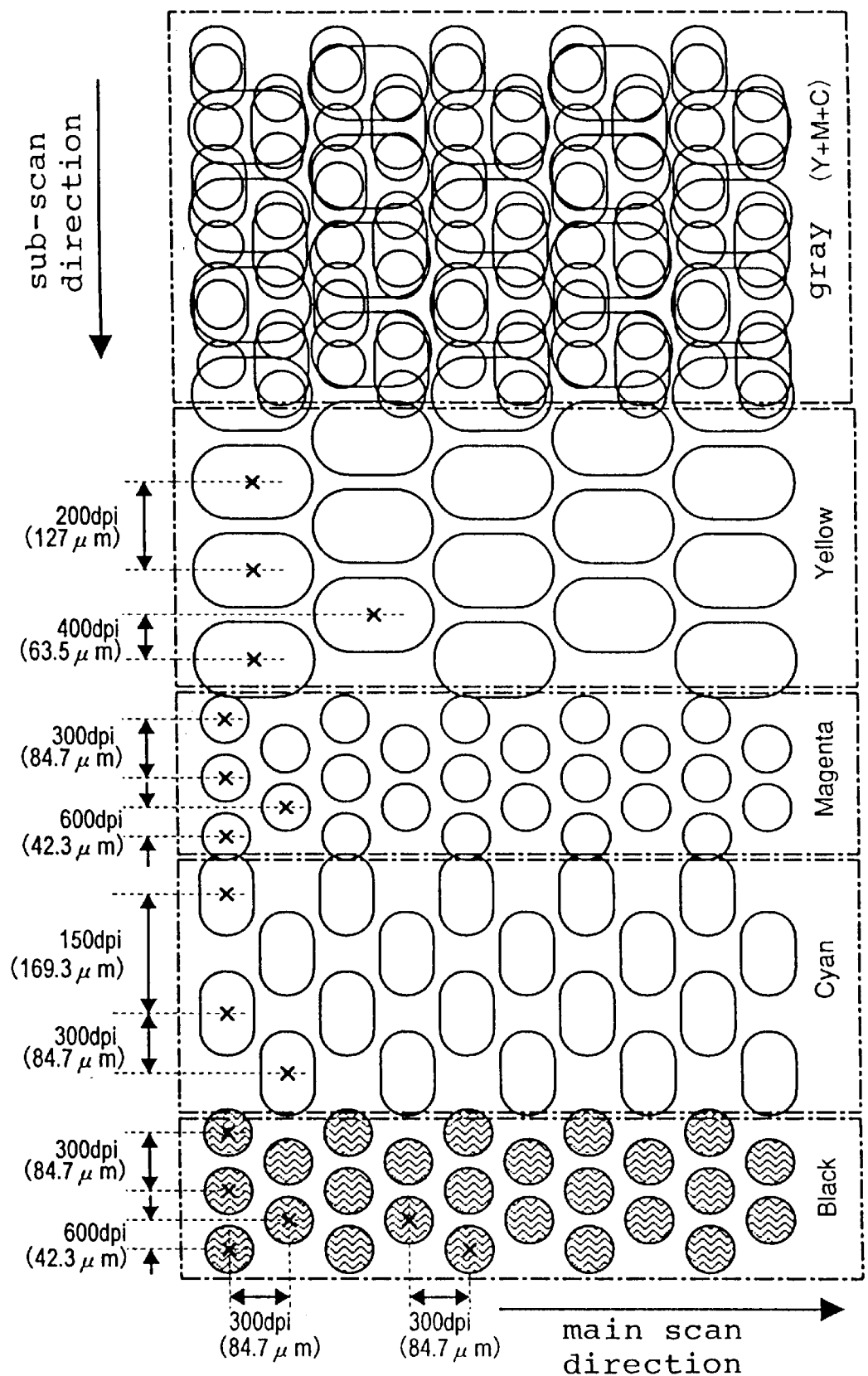
FIG. 1 is a view illustrating an example of the dispositions patterns of the record dots formed with the use of a melt type color thermal transfer recording method.
Figure 2:
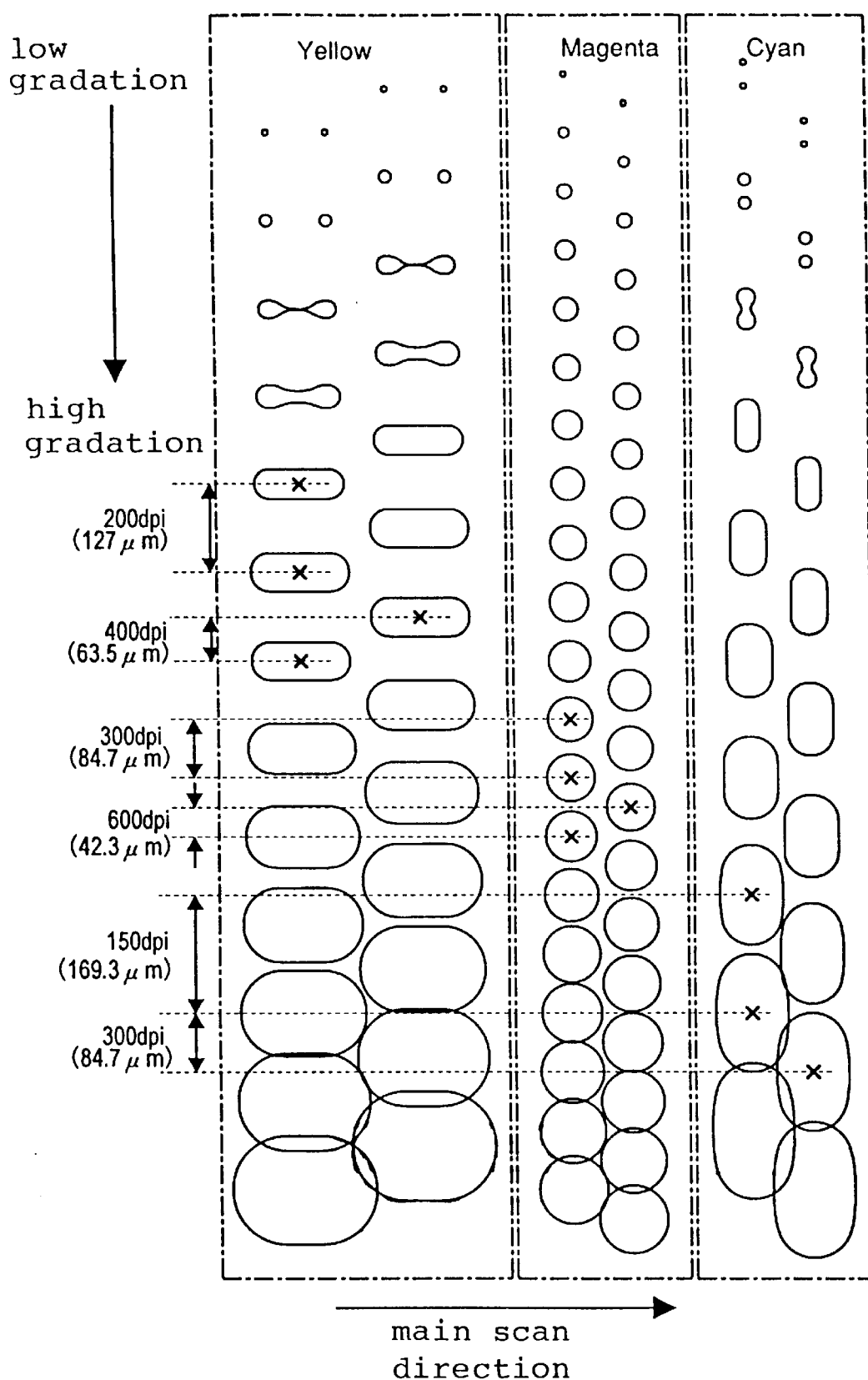
FIG. 2 is a view illustrating an example of a change in the configuration of the record dot relative to a change in the gradation level, which occurs in regard to three color "Y", "M" and "C" record dots that have been formed with the use of the melt type color thermal transfer recording method to which the present invention has been applied.

FIG. 1 illustrates an example of the disposition pattern of the record dots that have been formed on a transfer paper by the use of a melt type color thermal transfer recording method to which the present invention has been applied. This pattern is one which has been obtained by printing four colors of "Y", "M", "C" and "K" in this order. Also, FIG. 2 illustrates an example of the change in configuration of the record dots that occurs in correspondence with the change in level of the gradation. However, in a case where having formed the record dots by a driving method illustrated in FIG. 16, the detail of which will be described later, the resulting pattern differs from the pattern illustrated in FIG. 2.

Figure 19:
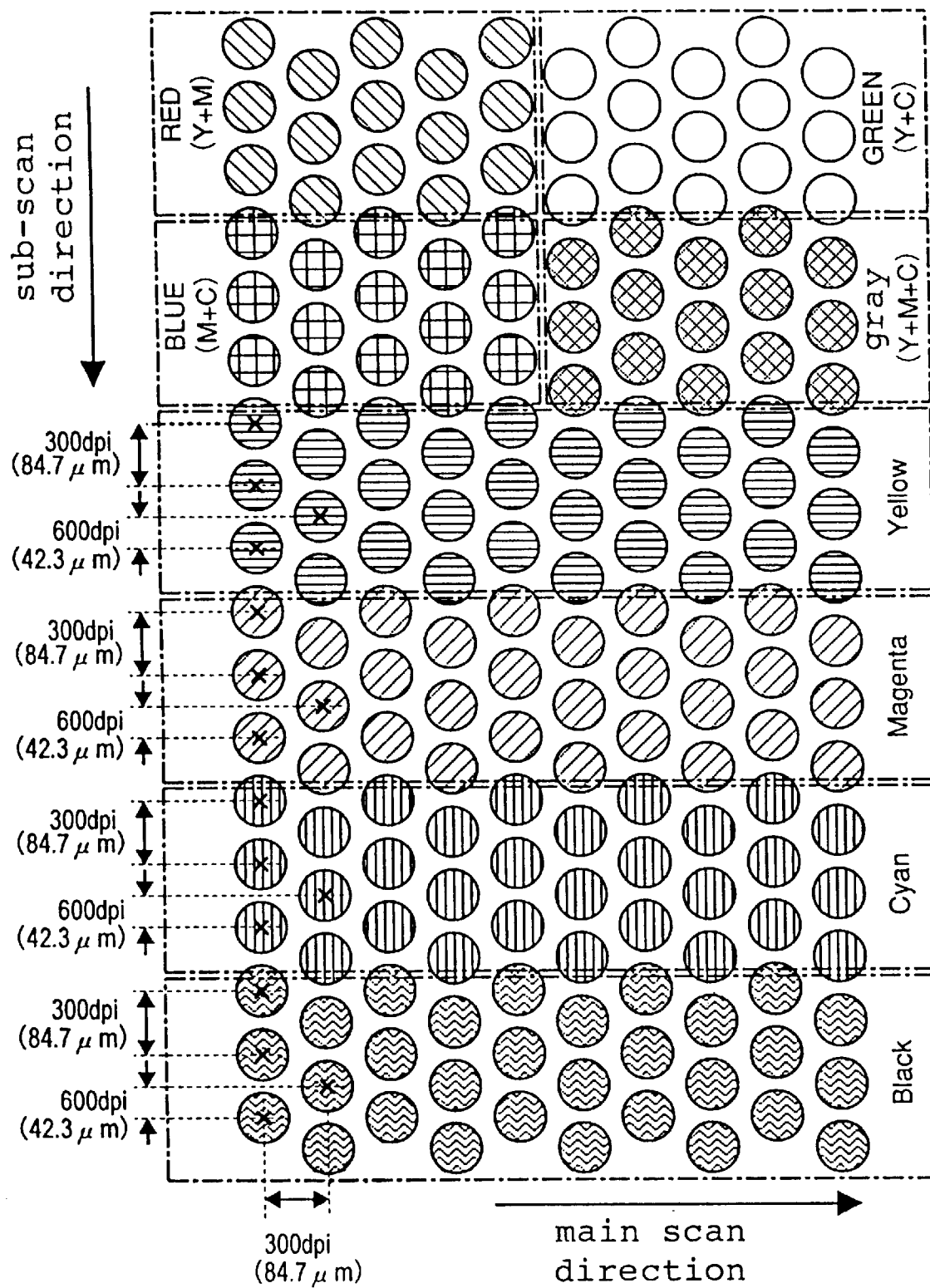
FIG. 19 is a view illustrating an example of the dispositions patterns of the record dots that have been formed on a transfer paper with the use of a conventional melt type color thermal transfer recording apparatus.

In FIG. 1, the "M" and "K" have the same disposition pattern as that which is illustrated in FIG. 19. That is, the pattern of each of the "M" and "K" is one which has been obtained by performing the ordinary one-dot zigzag printing with the resolution as viewed in each of the main scan and sub-scan directions being set to be at 300 dpi.

Also, the pattern of "Y" is made by setting the resolution as viewed in the sub-scan direction to be at 200 dpi and shifting the two successive record dots in each line every second two rows by ½ of the dot pitch in the sub-scan direction. And, as illustrated in FIG. 2, although during a low-gradation printing the two adjacent dots as viewed in the main scan direction are kept separated, these two dots are connected to each other as the gradation becomes higher. FIG. 1 illustrates a case where the two dots in the main scan direction are connected to each other whereby a single laterally elongate record dot is formed.

By shifting with respect to the record dots formed by the ordinary zigzag printing the timing for applying energy to a heat generating element in order to form the record dots in an odd line or an adjacent even line, the record dots of "C" are formed with respect to the record dots formed by ordinary zigzag printing at positions that are to be taken by the record dots in either one of an odd line and an adjacent even line being made near to the record dots in the other thereof. That is, whereas in the case of the ordinary one-dot zigzag printing, as illustrated in, for example, FIG. 19, the interval between the record dots in an odd line and the record dots in an adjacent even line as viewed in the sub-scan direction is the same (84.7 μm in the case of 300 dpi) every line-to-line interval when viewed in units of a row, in the case of the present invention the interval between two adjacent lines with respect to which the time interval at which current is applied has become short becomes shorter than 84.7 μm. And, concerning the record dots in two adjacent lines with respect to which the time interval at which current is applied has become short, as illustrated in FIG. 2, although during a low-gradation printing the record dots in two adjacent lines are kept separated, these record dots in two adjacent lines are connected to each other as the gradation becomes higher. FIG. 1 illustrates a case where the record dots in two adjacent lines are connected to each other. In this specification, forming the record dots in either one of an odd line and an adjacent even line at positions of their being made near to the record dots in the other thereof is called "capsule printing".

It is to be noted that in the pattern of FIG. 1 the printing of "M" and "K" maybe performed, instead of the ordinary zigzag printing, by forming the record dots of each thereof so that the disposition pitch of these record dots may become a non-integral multiple that is different from the non-integral multiple in the case of "Y" or by performing the capsule printing so that the configuration of the capsule may be different from that in the case of "C". Also, while in the upper part of FIG. 1 there is a pattern that has been printed in a triple color gray, this pattern will be explained next with reference to FIG. 3.

Figure 3:
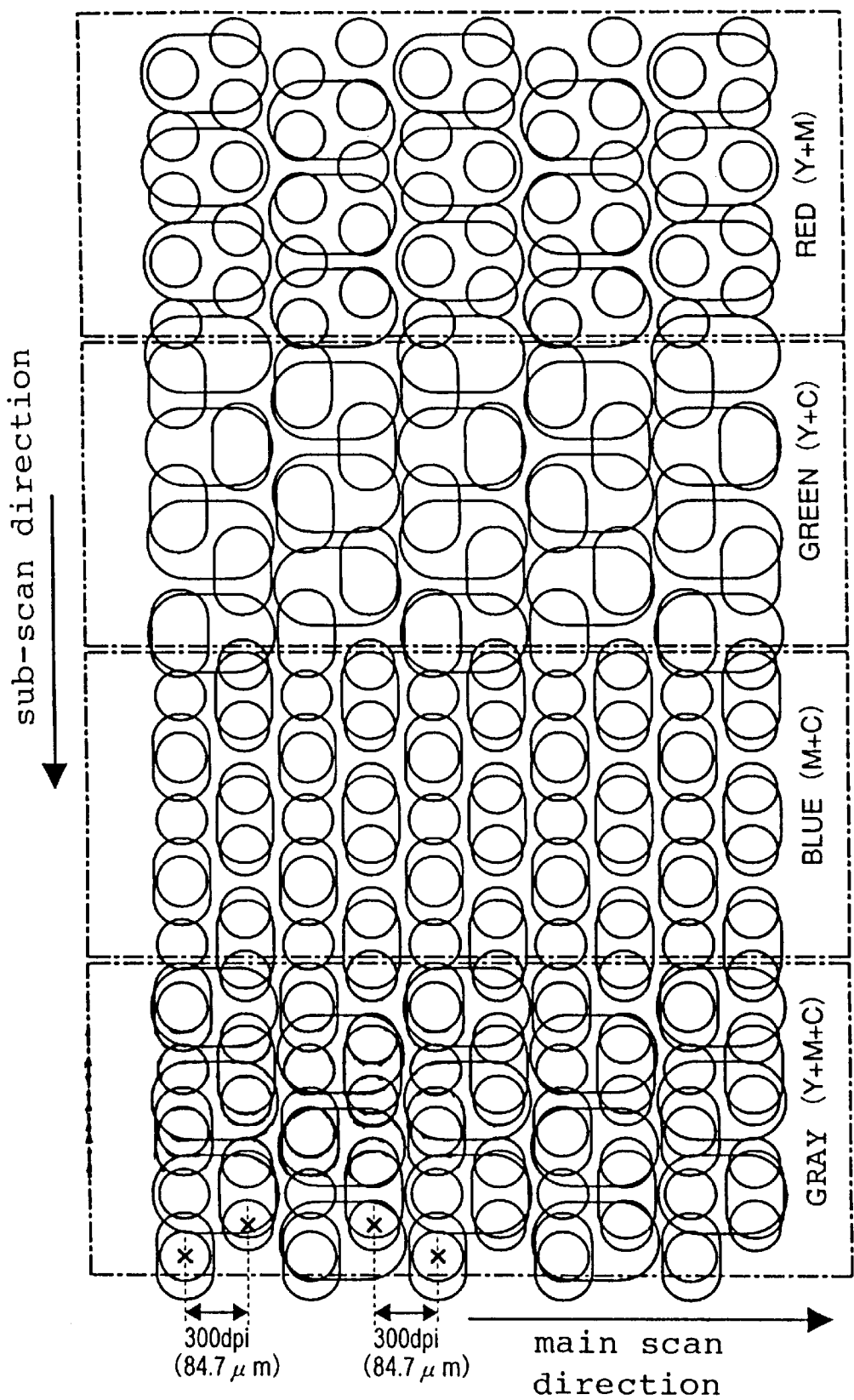
FIG. 3 is a view illustrating another example of the dispositions patterns of the record dots formed with the use of the melt type color thermal transfer recording method to which the present invention has been applied.

FIG. 3 illustrates another example of the dispositions pattern of the recording dots that have been formed on the transfer paper by the use of the melt type color thermal transfer recording method to which the present invention has been applied. This pattern is one which has been formed by printing the three colors of "Y", "M" and "C" or the four colors of "Y", "M", "C" and "K" in this order. And, in this pattern there are the portions wherein two colors or three colors have been printed in such a manner as to be superposed on one another. The reason why in this pattern the occurrence of the color moiré is suppressed will now be explained.

First, while the red portion is formed by "Y" and "M" being superposed one over the other, since the resolution of "M" as viewed in the sub-scan direction is 300 dpi and the resolution of "Y" as viewed in the sub-scan direction is 200 dpi, "M" and "Y" are in non-integral multiple relation to each other. Accordingly, the occurrence of the color moiré is suppressed for the above-mentioned reasons.

Next, while the blue portion is formed by "M" and "C" being superposed one over the other, since the record dots of "C" are formed with respect to the record dots of "M" at positions that are to be taken by the record dots in either one of an odd line and an adjacent even line being made near to the record dots in the other thereof, it is almost impossible that the record dots of "C" and those of "M" are superposed one over the other with the same configuration. For this reason, the occurrence of the color moiré is suppressed.

Also, while the green portion is formed by "Y" and "C" being superposed one over the other, since the record dots of "C" and those of "Y" are such that their resolutions as viewed in the sub-scan direction are in non-integral multiple relation to each other and since the record dots of "C" are formed with respect to the record dots formed by the ordinary zigzag printing at positions that are to be taken by the record dots in either one of an odd line and an adjacent even line being made near to the record dots in the other thereof, the occurrence of the color moiré is suppressed as in the case of the red portion and the blue portion.

And, while the triple color gray portion is formed by "Y", "M" and "C" being superposed one another, the occurrence of the color moiré is suppressed also in this triple color gray portion for the same reason as the reason why the occurrence of the color moiré is suppressed in the red, blue and green portions having been hereinbefore explained.

Figure 4:
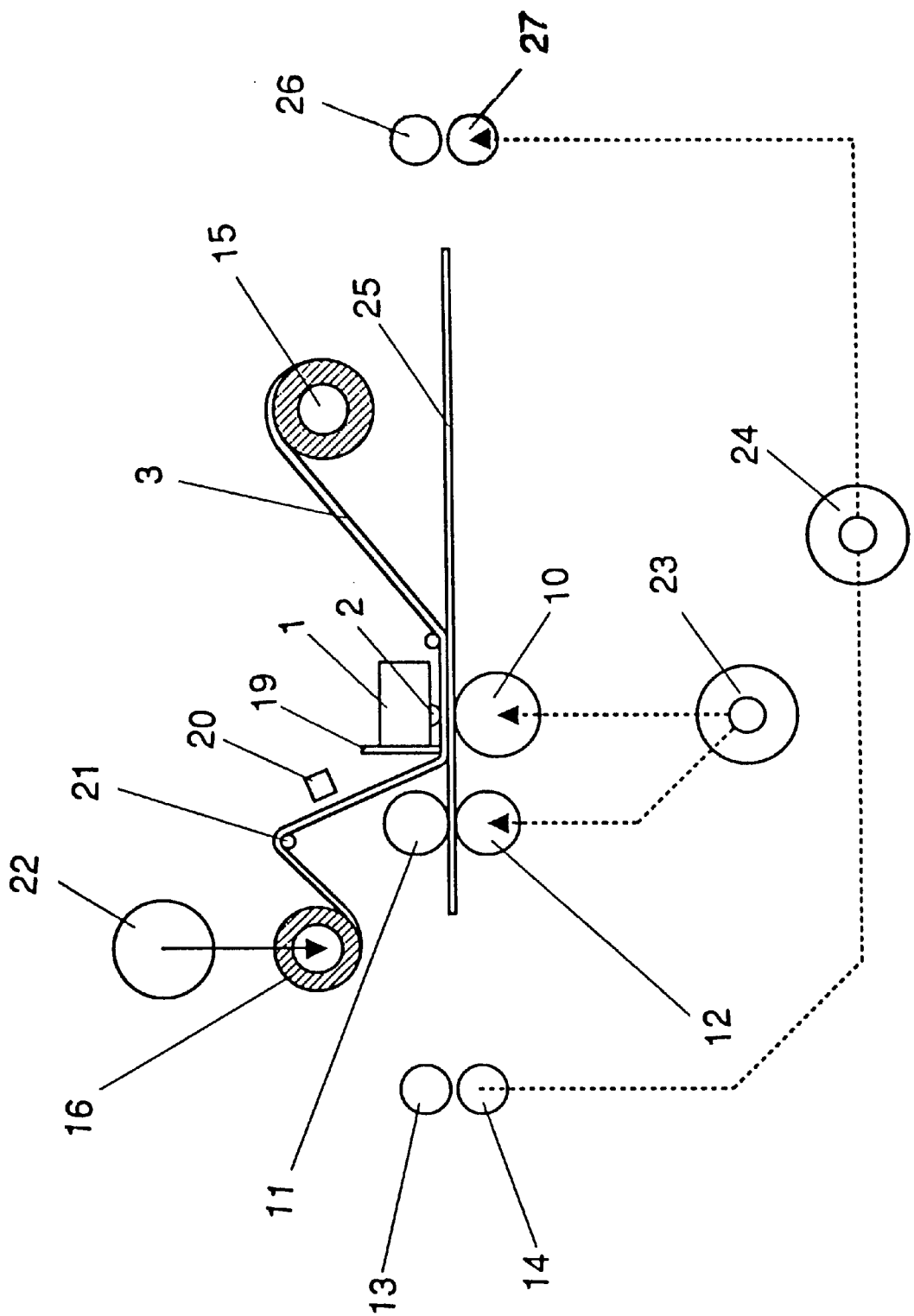
FIG. 4 is a view illustrating a schematic construction of a main part of the melt type color thermal transfer recording which is used in the present invention.

Next, means for obtaining the above-mentioned dispositions pattern of the record dots will be explained. FIG. 4 illustrates a schematic construction of a main part of a melt type color thermal transfer recording apparatus that is used in the present invention.

In a thermal head 1, there are disposed in one row a large number of heat generating resistors 2 (e.g., 3648 pieces) in the main scan direction. Each heat generating resistor has a size of, for example, 68 μm in the main scan direction and 80 μm in the sub-scan direction. And, these heat generating resistors 2 are disposed in such a way as to oppose a platen roller 10. Also, the thermal head 1 is constructed so as to be moved up and down between a position of its pressing an ink sheet 3 (FIG. 4 illustrates this position) and a position of its not pressing this ink sheet 3 through the operation of a driving mechanism (not illustrated).

The platen roller 10 and a pair of paper feed rollers 11 and 12 can be forward or reverse rotated every line in the sub-scan direction by a second stepping motor 23 that is controlled by a controller (not illustrated) to thereby convey a transfer paper 25. At a position that is before the platen roller 10 there are disposed a pair of paper supply rollers 26 and 27 for supplying the transfer paper to the platen roller 10 and a paper guide (not illustrated). Also, at a position that is after the paper feed rollers 11 and 12, there are disposed a pair of paper discharge rollers 13 and 14 and a paper discharge guide (not illustrated). The paper supply rollers 26 and 27 and paper discharge rollers 13 and 14 can be rotated in the sub-scan direction by a DC motor 24 that is controlled by a controller (not illustrated) to thereby convey the transfer paper 25.

Further, an ink sheet supply roller 15 and an ink sheet take-up roller 16 are provided. The ink sheet take-up roller 16 is rotatable by a first stepping motor 22 that is controlled by a controller (not illustrated). Also, at an end of the thermal head 1 on the side of the ink sheet take-up roller 16 there is disposed a peel plate 19 for stably peeling off the ink sheet 3 and transfer paper 25 after thermal transfer has been made. Further, in order to prevent a change in the peel angle even when the diameter of the take-up side has been increased by the ink sheet 3 being taken up, there is disposed an ink sheet guide roller 21 between the peel plate 19 and the ink sheet take-up roller 16.

As shown in FIGS. 5A and 5B, the ink sheet 3 has a base layer 3A which is made of a PET (polyethylene terephthalate) film or the like and on which ink layers 3B of "Y", "M", "C" and "K", each consisting of heat meltable ink that has as main raw material a wax that contains pigment, are coated in units of an image plane in this order. The color of the ink sheet 3 that opposes the thermal head 1 can be changed over in the order of "Y", "M", "C" and "K" by rotating the ink sheet take-up roller 16. And, near the ink layers each having a corresponding color there are respectively added patterns (not illustrated) that are each used for the ink sheet sensor 20 to discriminate the color of each ink layer.

Figure 6:
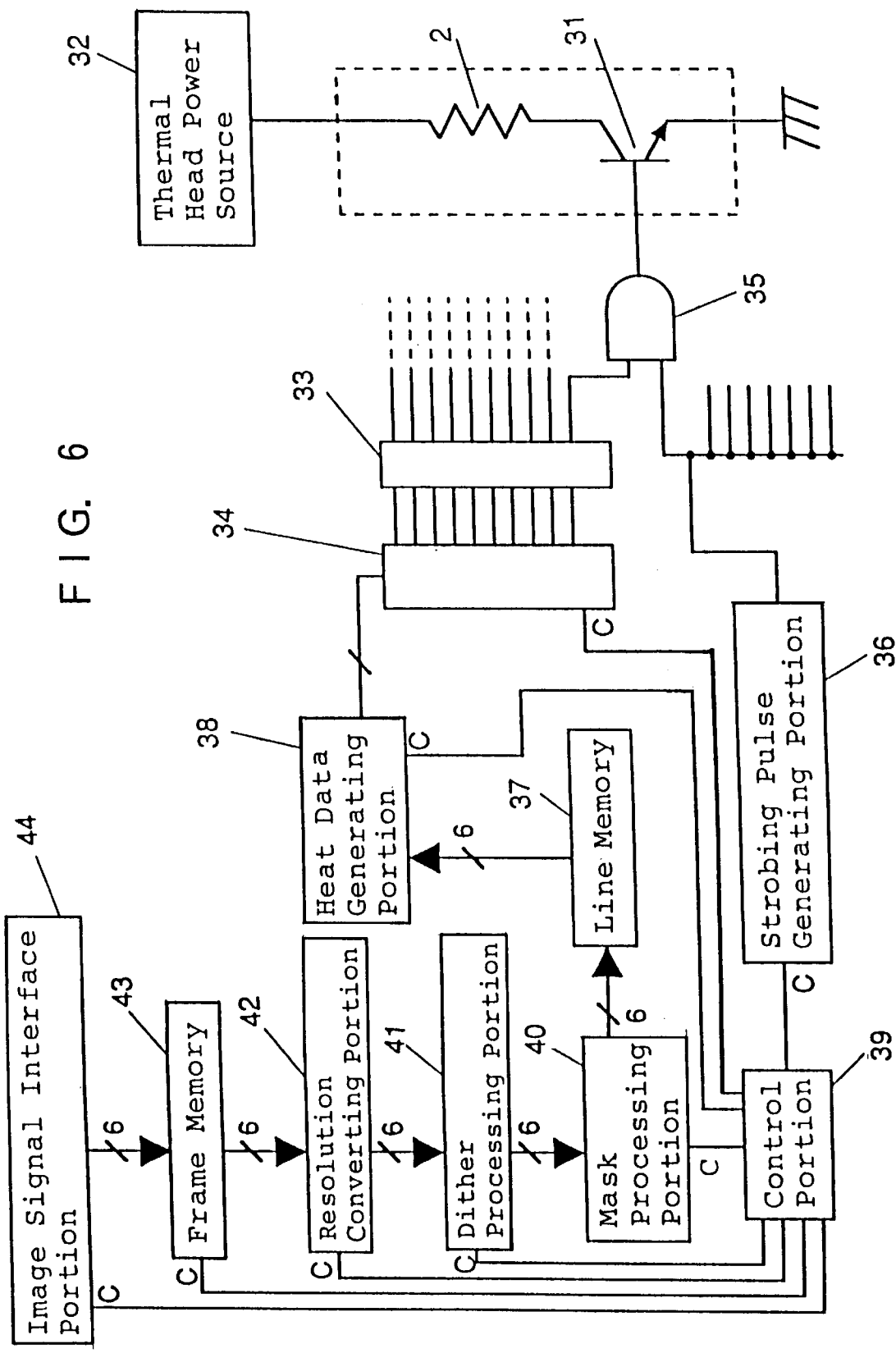
FIG. 6 is a block diagram illustrating the construction of a thermal head drive control section.

FIG. 6 is a block diagram illustrating the construction of a thermal head drive control section. With the heat generating resistors 2 of the thermal head, there are connected in series a switching element constituted by a transistor 31 and a thermal head power source 32, whereby when this transistor 31 is "on", current is supplied from the thermal head power source 32 to the heat generating resistors 2.

An image signal interface portion 44 receives from a host computer (not illustrated) image data in the form of, for example, a transcript and transmits to a frame memory 43 in plane sequence of "Y", "M", "C" and "K" image data with a resolution of 300 dpi/main scan direction×300 dpi/sub-scan direction and a maximum gradation of 3648 dots×5400 dots, each dot being composed of 6 bits.

The frame memory 43 reads out its stored image data for each color in units of a predetermined number of lines and transmits it to a resolution converting portion 42. The resolution converting portion 42 converts the resolutions as viewed in the sub-scan direction to prescribed resolutions depending upon the color of the image data. FIGS. 7 and 8 illustrate examples of the calculations that are made when converting to 600 dpi and 400 dpi, respectively. It is to be noted that in FIGS. 7 and 8 the 0th line image data a0 is data that is needed in relation to the algorithm for use in the resolution conversion calculation and, in actual calculations, the 1st line image data a1 is used.

In a dither processing portion 41, by superposing a (2×2) dither matrix with respect to image data with 64 gradations, there is obtained image data with apparent 256 gradations per color. In a mask processing portion 40, selection is made of one of the mask patterns illustrated in FIGS. 9A–9C in correspondence with the data to be printed to thereby perform mask processing with respect to the image data. A line memory 37 can store image data that corresponds to, for example, 4 lines and, each time 1-line data is used, stores a new set of 1-line data. That is, by increasing the lines number as viewed in the sub-scan direction in the resolution converting portion 42 and selecting in the mask processing portion 40 the dots that correspond to the increased line number, there is set the dot forming timing as viewed in the sub-scan direction.

A heat data generating portion 38 determines whether or not the gradation of each dot is not less than 1 while referring to the data within the line memory 37, and, if the gradation is not less than 1, generates heat data of "1" and, if the gradation is less than 1, generates heat data of "0". And, it generates heat data in regard to all bits in one line and transmits it to a shift register 34 serially. The 1-line heat data that has been written into the shift register 34 is written in parallel into a latch 33 in synchronism with a 1-gradation pulse of the strobing pulses generated from a strobing pulse generating portion 36. Since an AND element 35 makes a transistor 31 turn "on" during a time period in which the 1-gradation pulse of the strobing pulses is high and the heat data held in the latch 33 is "1", current is supplied during this time period from the thermal head power source 32 to the heat generating resistor 2. By executing this processing from the gradation 1 to the gradation 63, there is completed the printing of the 1-line image data. It is to be noted that this sequential order in which the gradation processing is performed corresponds to a case where the strobing pulses have a composition-A illustrated in FIG. 10A. In a case where the strobing pulses have a composition-B illustrated in FIG. 10B, the gradation processing is performed in a reverse sequential order, that is, first, the 63-gradation processing is performed and finally the 1-gradation processing is performed. It is to be noted that the detail of the strobing pulses will be described later.

After the completion of the printing of 1-line image performed data in this way, performing printing of all lines in the same way, one-color printing with respect to one image plane is ended. And, by further performing printing of each of the four colors plane-sequentially, recording of one sheet of color image is ended. The thermal head drive control section that has been explained hereinabove is sequence controlled by a control portion 39.

FIGS. 10A and 10B illustrate strobing pulses that are generated from the strobing pule generating portion 36. The strobing pulse generating portion 36 can generate the strobing pulse of composition-A illustrated in FIG. 10A or the strobing pulse of composition-B illustrated in FIG. 10B according to the control of the control portion 39. While a detailed explanation of in what case the composition-A or composition-B is to be selected is given later, the features of the compositions-A and -B will be explained here. In the strobing pulses having a composition-A, initially, the gradation 1 has a high level and thereafter the gradations 2, 3, 4, . . . 62, and 63 have high levels, respectively, in that order. On the other hand, in the strobing pulses having a composition-B, the gradations 63 initially has a high level and thereafter, the gradations 62, 61, 60, . . . , 2 and 1 have high levels, in that order. The pulse widths of these strobing pulses differ from one another for every gradation level and these pulse widths are set every gradation level in order to impart proper gradations to the transferred results. And, the gradation when transfer has been made is expressed by the size of the record dot. It is to be noted that the strobing pulse generating portion 36 can also generate in addition to the strobing pulses having the compositions-A and -B strobing pulses having still another composition, which will be described later.

Next, the operation of the above-mentioned melt type color thermal transfer recording apparatus will be explained.

In FIG. 6, a computer (not illustrated) supplies to the thermal transfer recording apparatus a signal for giving an instruction to start the printing operation, whereby the thermal transfer recording apparatus starts the printing operation and the image data signal that has been sent out from a host computer (not illustrated) is stored into the frame memory 43 through the image signal interface portion 44.

The image data sent from the host computer to the image signal interface portion 44, which is here referred to, is a digital signal which has an 8-bit width per color. However, this is not limitative in the application to the present invention.

The image signal that is transmitted from the host computer to the thermal transfer recording apparatus may be sometimes an RGB image, sometimes a CMYK image that is composed of image data having four colors of "C", "M", "Y" and "K" and sometimes an image which has a resolution other than 300 dpi. Therefore, in the image signal interface portion 44, when the image that has been sent thereto is an RGB image, this image is converted to a CMYK image and when the resolution is other than 300 dpi, the image is converted to an image having a resolution of 300 dpi with the use of a resolution increasing/decreasing function, after which the resulting image data is written into the frame memory 43. That is, the image data signal that is written from the image signal interface portion 44 into the frame memory 43 is a CMYK data signal and therefore is of course a digital signal.

Also, one pixel in the image data signal (a unit that s composed of four bytes in total of "C", "M", "Y" and "K") corresponds in the ratio of 1:1 to one given piece of heat generating resistor 2 of the thermal head 1.

In FIG. 4, by the paper supply rollers 26 and 27 being rotated in parallel with the transmission of the image data, the transfer papers 25 that have been disposed in the paper supply guide (not illustrated) are drawn one sheet at a time into the apparatus. At a point in time when the transfer paper 25 has been conveyed up to the position of the paper feed rollers 11 and 12, the succeeding conveyance is performed predominantly by the paper feed rollers 11 and 12. When a portion of the transfer paper 25 that is 10 lines or so before the print starting line has been brought under the heat generating resistors 2 of the thermal head 1, the conveyance is stopped once. Next, by the ink sheet take-up roller 16 being rotated, the ink sheet 3 is taken up. When the ink sheet sensor 20 has sensed the ink layer of "Y" on the ink sheet 3, the take-up of the ink sheet is stopped once and then the thermal head 1 is moved down, whereby the print starting line portion of the transfer paper 25 and the ink sheet 3 are clamped between the heat generating resistors 2 and the platen roller 10, whereby the thermal head waits for a print starting instruction from the controller.

In FIG. 6, when the storage of the image data of "Y" to be printed that corresponds to one image plane is completed, the resolution converting portion 42 receives image data from the frame memory 43 in units of 1 to several lines and performs resolution conversion calculations (FIG. 8) for converting the resolutions thereof as viewed in the sub-scan direction from 300 dpi to 400 dpi and transmits the resulting image data to the dither processing portion 41. In the dither processing portion 41, dither processing is performed with respect to the 6-bit image data by the use of the 2×2 dither matrix to thereby provide image data with apparent 256 gradations. In the mask processing portion 40 that has received this image data, mask processing is performed with respect thereto in correspondence with a pattern of the printing dots by the use of the mask pattern illustrated in FIG. 9A or FIG. 9B, whereby the mask processing portion 40 transmits the resulting image data to the line memory 37.

The heat data generating portion 38 binarizes all 1-line pixels stored in the line memory 37 every gradation and transmits the resulting image data to the shift register 34. The concrete processing that is performed in the heat data generating portion 38 is performed, with respect to the gradation levels of the image data stored in the line memory 37, in such a way as to sort the pixels having a gradation of 1 or more into "1" and sort the pixels having the other gradations into "0" and transmits the resulting binary image data to the shift register 34.

The shift register 34 has a capacity that corresponds to the same number (e.g., 3648) of dots as the number of the heat generating resistors 2, whereby when the transmission to the shift register 34 has been completed, the heat data is latched parallel into the latch 33. And, when this latch has been completed, the heat data generating portion 38 sorts with regard to the first line of "Y" the pixels having a gradation of 2 or more into "1" and starts to transmit similarly the resulting binary image data to the shift register 34. At this point in time, since the preparation for printing has been completed, the paper feed rollers 11 and 12 and the platen roller 10 start the conveyance of the transfer paper 25 and the ink sheet take-up roller 16 starts the take-up of the ink sheet 3. In synchronism with these starting operations, the strobing pulse generating portion 36 generates repeatedly the strobing signal such as that which is illustrated in FIG. 10A until the final line of "Y".

During a time period in which the strobing pulses corresponding to the 1-gradation image data is "1", the base of the transistor 31 for the heat generating resistor 2 corresponding to the latch 33 output "1" (the 1-gradation heat data) becomes high, with the result that the heat generating resistor 2 is energized to generate heat whereby ink is transferred onto the transfer paper 25. By the point in time when the strobing signal corresponding to the 1-gradation image data is ended, the heat data generating portion 38 transmits to the shift register 34 the heat data that has been prepared by sorting with respect to the "Y" 1st line gradation data the pixels having a gradation of 2 or more into "1", whereby this heat data is latched when the strobing signal corresponding to the 1-gradation image data has been ended. And, upon completion of the latch operation, the strobing pulse generating portion 36 continues to generate the strobing pulses during a time length corresponding to the 2-gradation image data, the base of the transistor 31 for the heat generating resistor 2 corresponding to the latch 33 output "1" (the 2-gradation heat data) becomes high successively to the processing of the 1-gradation image data, with the result that the heat generating resistor 2 is successively energized to generate heat whereby ink is transferred onto the transfer paper 25.

Thereafter, the above-mentioned operations are repeatedly performed with respect to the "Y" 1st line image data stored in the line memory 37 in the sequential order of 3, 4, 5, . . . 61, 62 and 63.

When the "Y" 1st line printing is completed in this way, image data before conversion that is necessary for the printing of the next line is read out from the frame memory 43 and the "Y" 2nd line image data is stored into the line memory 37 through the resolution converting portion 42, dither processing portion 41 and mask processing portion 40. The heat data generating portion 38 reads out the "Y" 2nd line gradation image data from within the line memory 37 and binarizes all 2nd-line pixels every gradation as in the case of the 1st line pixels and transmits the resulting image data to the shift register 34 as serial data. When the heat data corresponding to the "Y" 2nd line gradation 1 image data is latched and a time period of 7.5 msec lapses and the transfer paper 25 is conveyed 63.5 μm from the start of the "Y" 1st line printing, the heat generating resistor 2 is energized with the strobing pules corresponding to the "Y" 2nd line gradation 1 image data, whereby ink is transferred. Thereafter, as in the case of the 1st line image data, this operation is repeatedly performed in the sequential order of the gradation levels 2, 3, 4, 5, . . . 61, 62 and 63.

By printing the "Y" 1st and 2nd lines image data as explained above, the printing of the 1st line record dots with a dot pitch of 200 dpi is ended. As stated before, the printing of these record dots is the ordinary 2-dot zigzag printing.

When the "Y" 2nd line printing is ended, the above-mentioned operations are repeatedly performed in the sequential order of "Y" 3rd line, 4th line, 5th line, 6th line . . . and final line after the lapse of every 7.5 msec each time the transfer paper 25 is conveyed 63.5 μm, whereby the ordinary 2-dot zigzag printing is performed from the 2nd line to the final line by shifting the image data every 2 lines. It is to be noted that since the final line corresponds to a total number of lines as viewed in the sub-scan direction that covers the image data to be printed.

Here, the pulses that are applied to the transistor 31 in order to form the "Y" record dots illustrated in FIG. 1 will now be explained. FIG. 11 illustrates an example of the pulses that are applied to the transistor 31 when forming the "Y" record dots. This example has the following features.

(1): that current is applied once every row within a time period of every 15 msec, namely, 200 dpi image data is applied in the sub-scan direction. And, (2): that, in order to perform the 2-dot zigzag printing, the timing with which current is applied is shifted every two rows by a time length (7.5 msec) corresponding to ½ of the dot pitch as viewed in the sub-scan direction, e.g., a time difference of 7.5 msec is provided between the timing for starting the application of current in each of the 1st and 2nd rows and the timing for starting the application of current in each of the 3rd and 4th rows.

As a result, in FIG. 11, the respective two dots that are formed by, for example, a pulse unit of a pulse P1 and a pulse P3, a pulse unit of a pulse P2 and a pulse P4, a pulse unit of a pulse P5 and a pulse P7 and a pulse unit of a pulse P6 and a pulse P8 are connected to each other in the main scan direction when the gradation level is relatively high, with the result that the record dot pattern becomes a "Y" pattern that is illustrated in FIG. 1. It is to be noted that in this case the mask processing portion 40 uses the mask pattern illustrated in FIG. 9B.

Figure 12:
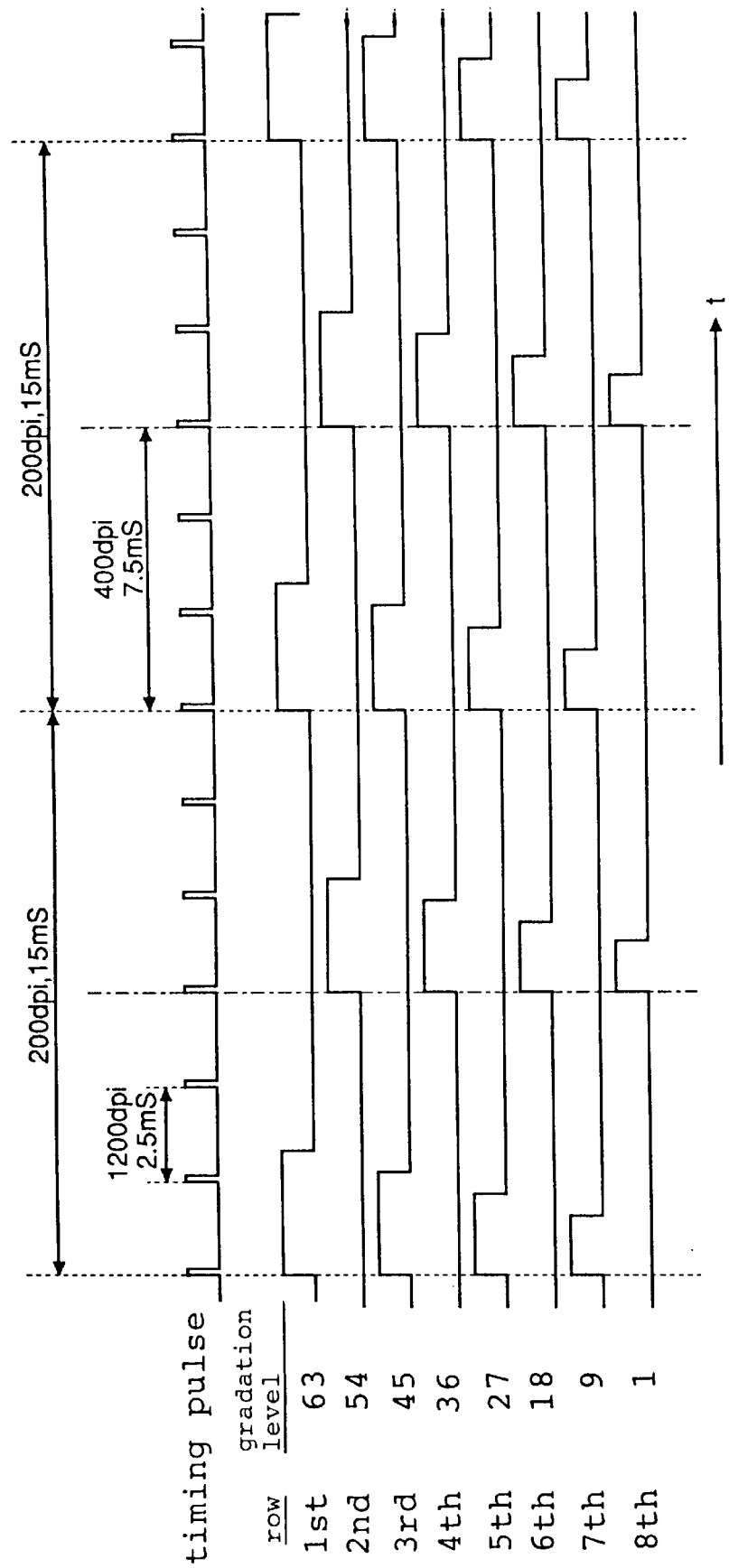
FIG. 12 is a view illustrating another example of pulses that are applied to the transistor of FIG. 6 when forming "Y" record dots.

FIG. 12 illustrates another example of the pulses that are applied to the transistor 31 when forming the "Y" record dots. While this example is the same as that of FIG. 11 in the respect of having the above-mentioned feature (1), the zigzag printing is not the 2-dot zigzag printing but the 1-dot zigzag printing. For this reason, a time difference of 7.5 msec is provided between the timing for the application of current in a line in the row that stands in an odd number of order and the timing for the application of current in the same line in the row that stands in an adjacent even number of order. Accordingly, the record dots that are formed by these pulses differ from those which are illustrated in FIG. 1, namely they are not connected to each other in the main scan direction. In this case, the mask processing portion 40 uses the mask pattern illustrated in FIG. 9A.

When the "Y" final line printing is completed in this way whereupon a final-line portion of the transfer paper 25 is peeled off, the thermal head 1 is brought to the "up" state and the rotation of the ink sheet take-up roller 16 is stopped. Next, by the paper feed rollers 11, 12 and the platen roller 10 being reverse rotated, the transfer paper 25 is returned back to the recording position at which the portion thereof that is 10 lines or so before the print starting line thereof is clamped between the heat generating resistors 2 and the platen roller 10. Also, simultaneously, by the ink sheet take-up roller 16 being rotated, the ink sheet 3 is fed until the ink sheet sensor 20 senses the "M" ink layer on the ink sheet 3.

And, at a point in time when the "M" ink layer has been sensed, the take-up of the ink sheet is stopped once and then the thermal head 18 is moved down to the position that is illustrated in FIG. 4 and waits for an instruction to start the printing of the "M" image data from the controller (not illustrated). Since the sequence of the printing operation for printing the "M" image data is basically the same as the sequence of the printing operation for printing the "Y" image data that has been explained hereinbefore, the difference therebetween will be mainly explained for avoiding the redundancy of the explanation.

Figure 20:
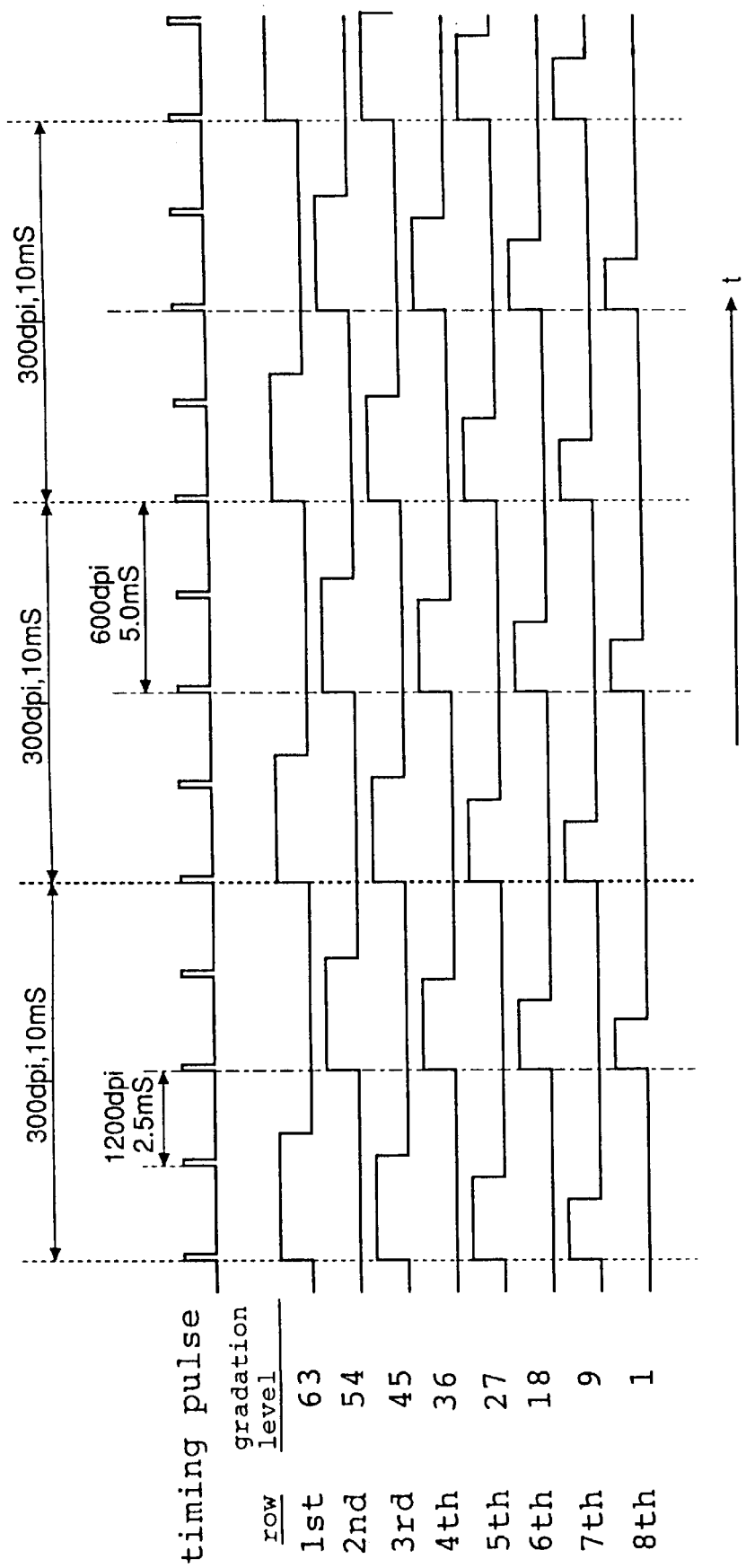
FIG. 20 is a view illustrating an example of the timings for pulses that are applied to an energization control switch of a thermal head when realizing a zigzag printing. And, FIG. 21 is a view illustrating an example of the dispositions pattern of the record dots wherein there are portions where "C" is relatively shifted with respect to "Y" and "M".
Figure 21:
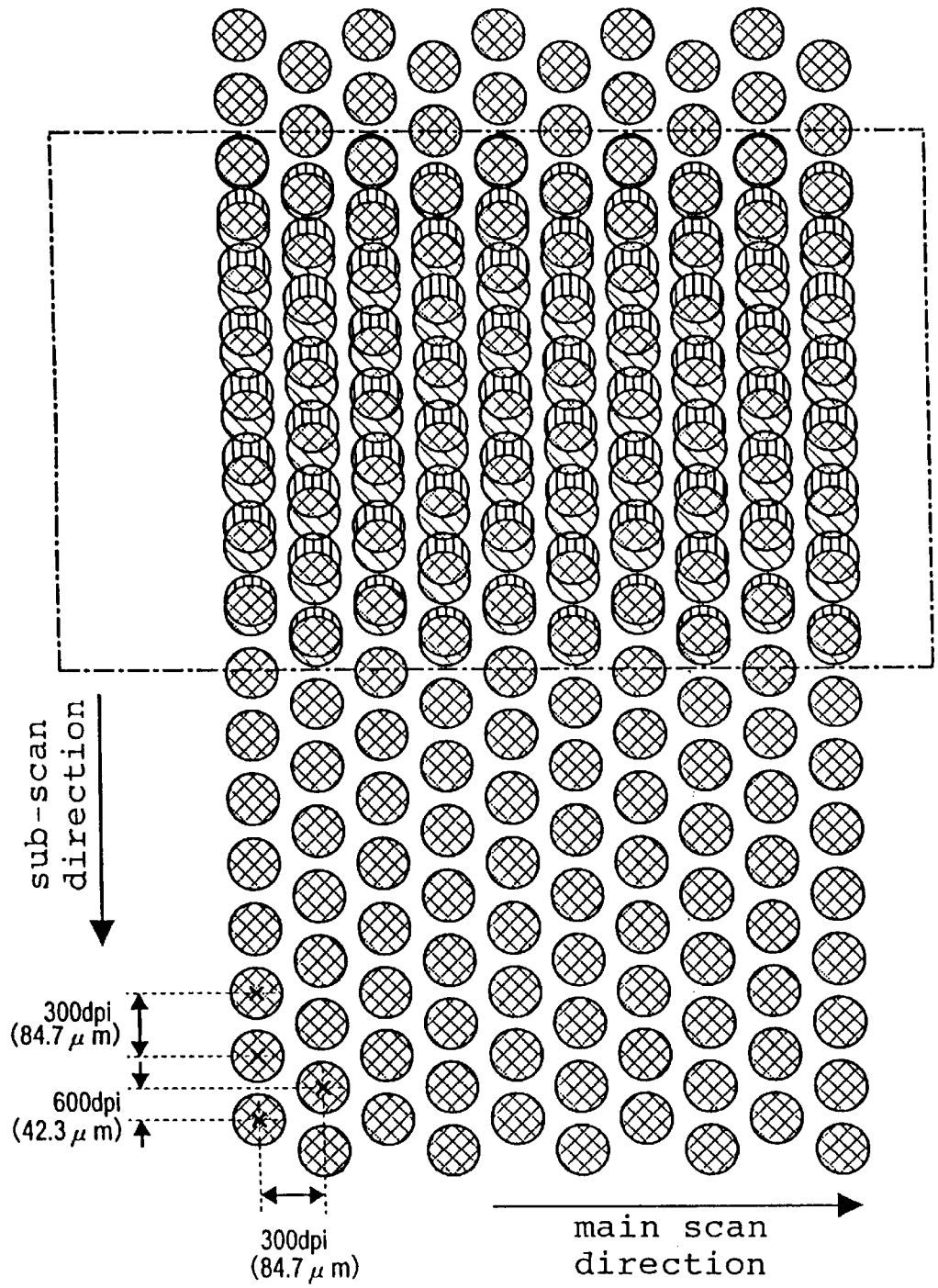

As illustrated in FIG. 1, since the pattern of "M" is one which has been obtained by the ordinary 1-dot zigzag printing, the record dots to be printed are recorded at a dot pitch of 300 dpi in the sub-scan direction. Accordingly, the resolution converting portion 42 performs from 300 dpi-to-600 dpi conversion processing (FIG. 7) and the mask processing portion 40 uses the mask pattern illustrated in FIG. 9A. Also, the strobing pulse generating portion 36 generates the pulse illustrated in FIG. 10A. And, the pulses that are applied to the switching element of the thermal head are the same as those which are illustrated in FIG. 20.

Every 5 msec lapse and every 42.3 μm conveyance of the transfer paper 25, the "M" image data is printed one line, whereby the 1-line record dots with 300 dpi that are illustrated in FIG. 1 are formed from the image data that is printed every 2 lines. As stated before, the printing of these record dots is the ordinary 1-dot zigzag printing. When the ordinary 1-dot zigzag printing with 300 dpi has been performed up to the final line whereupon the final-line portion is peeled off, the thermal head is brought to the "up" state and simultaneously the rotation of the ink sheet take-up roller 16 is stopped. Next, by the paper feed rollers 11, 12 and the platen roller 10 being reverse rotated, the transfer paper 25 is returned back to the recording position at which the portion thereof that is 10 lines or so before the print starting line thereof is clamped between the heat generating resistors 2 and the platen roller 10. Also, simultaneously, by the ink sheet take-up roller 16 being rotated, the ink sheet 3 is fed until the ink sheet sensor 20 senses the "C" ink layer on the ink sheet 3.

And, at a point in time when the "C" ink layer has been sensed, the take-up of the ink sheet is stopped once and then the thermal head 1 is moved down to the position that is illustrated in FIG. 4 and waits for an instruction to start the printing of the "C" image data from the controller (not illustrated). Since the sequence of the printing operation for printing the "C" image data is basically the same as the sequence of the printing operation for printing the "Y" and "M" image data that has been explained hereinbefore, the difference therebetween will be mainly explained for avoiding the redundancy of the explanation.

As has been explained with reference to FIG. 1, since by shifting with respect to the record dots formed by the ordinary 1-dot zigzag printing the timing for applying energy to the heat generating resistors in order to form the record dots in an odd line or an adjacent even line, the record dots of "C" are formed with respect thereto at positions that are to be taken by the record dots in either one of an odd line and an adjacent even line being made near to the record dots in the other thereof, recording is performed at 300 dpi in the sub-scan direction. Accordingly, the resolution converting portion 42 performs the resolution conversion calculations illustrated in FIG. 7 and the mask processing portion 40 uses the mask pattern illustrated in FIG. 9C. Also, the strobing pulse generating portion 36 generates at least one type of strobing pulses of the strobing pulses type illustrated in FIG. 10A, the strobing pulses type illustrated in FIG. 10B and a third-composition strobing pulses type as described later.

Figure 13:
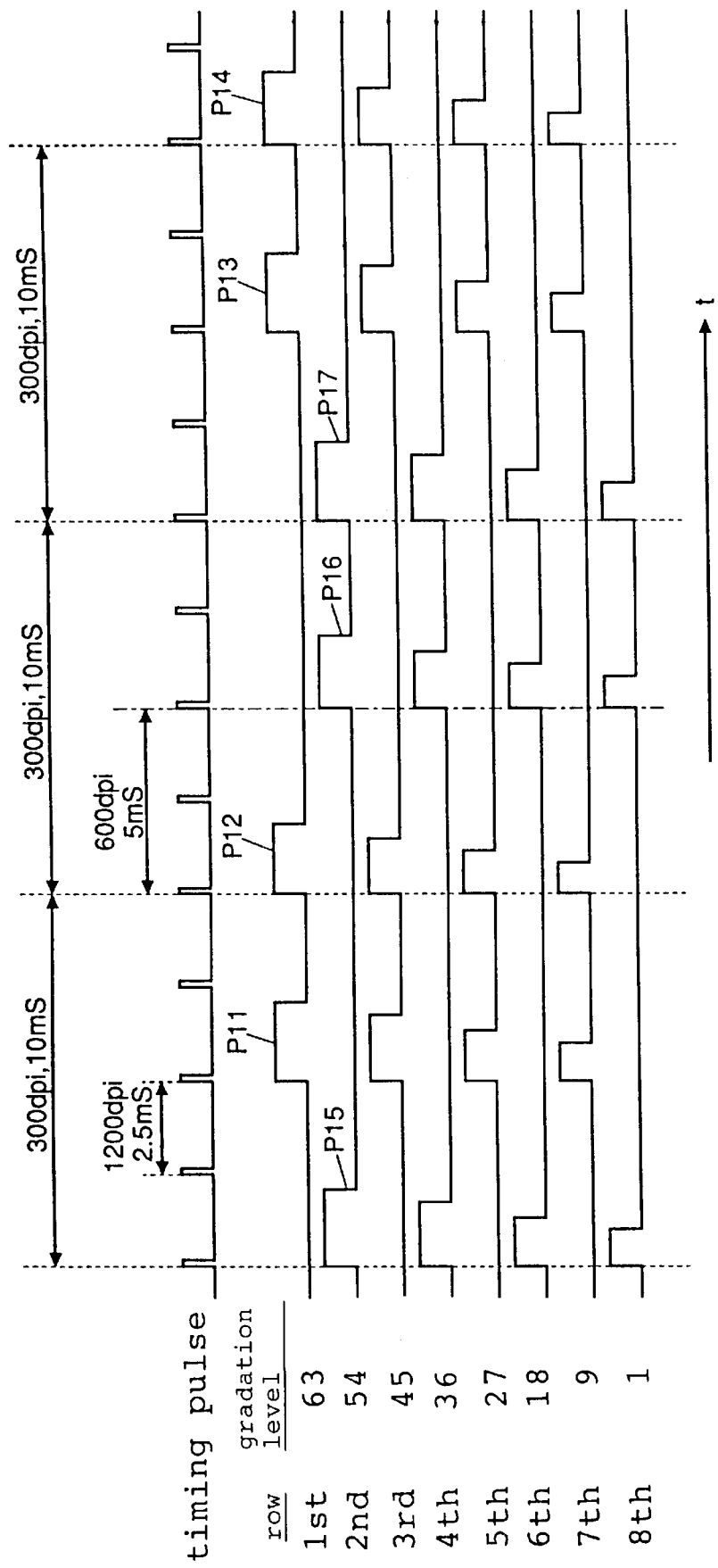
FIG. 13 is a view illustrating an example of pulses that are applied to the transistor of FIG. 6 when forming "C" record dots.

FIG. 13 illustrates an example of the pulses that are applied to the transistor 31 when forming the "C" record dots. The following feature (3) is the same as in the case of "M" (the "K" is also the same as in the case of "M" as described later) that has been stated in connection with the conventional method illustrated in FIG. 20 or that has been stated in this embodiment.

(3): that current is applied once every odd row and every even row within a time period of every 10 msec, namely, 300 dpi image data is applied in the sub-scan direction. Also, the following feature (4) is also the same as in the case of FIG. 20 or "M" and "K".

(4): that, in order to perform the zigzag printing, a time difference is provided between the timing for starting the application of current in a line in the row that stands in an odd number of order and the timing for starting the application of current in the same line in the row that stands in an adjacent number of order. However, here, further, the following feature is exhibited.

(5): that the interval of the timing for starting the application of current in each row is expanded or contracted regularly.

For example, while the interval between the leading edge of a pulse P11 and the leading edge of a pulse P12 and the interval between the leading edge of a pulse P13 and the leading edge of apulse P14 in the1st row are each 5.0 msec, the interval between the leading edge of the pulse P12 and the leading edge of the pulse P13 is 15 msec. Similarly, while the interval between the leading edge of a pulse P16 and the leading edge of a pulse P17 in the 2nd row is 5.0 msec, the interval between the leading edge of a pulse P15 and the leading edge of the pulse P16 is 15 msec. As a result, the record dots formed by two adjacent pulses the interval between the leading edges of which is 5.0 msec come near to each other, whereby the capsule printing such as that illustrated in FIGS. 1 and 2 is realized. In this case, the strobing pulse generating portion 36 generates the strobing pulses having the composition A illustrated in FIG. 10A. Also, in this case, when observing the interval between two pulses that form a capsule, while the interval between the leading edges thereof is 5.0 msec which is fixed, the interval between the trailing edge of the preceding pulse and the leading edge of the next succeeding pulse widens as the gradation decreases.

Figure 14:
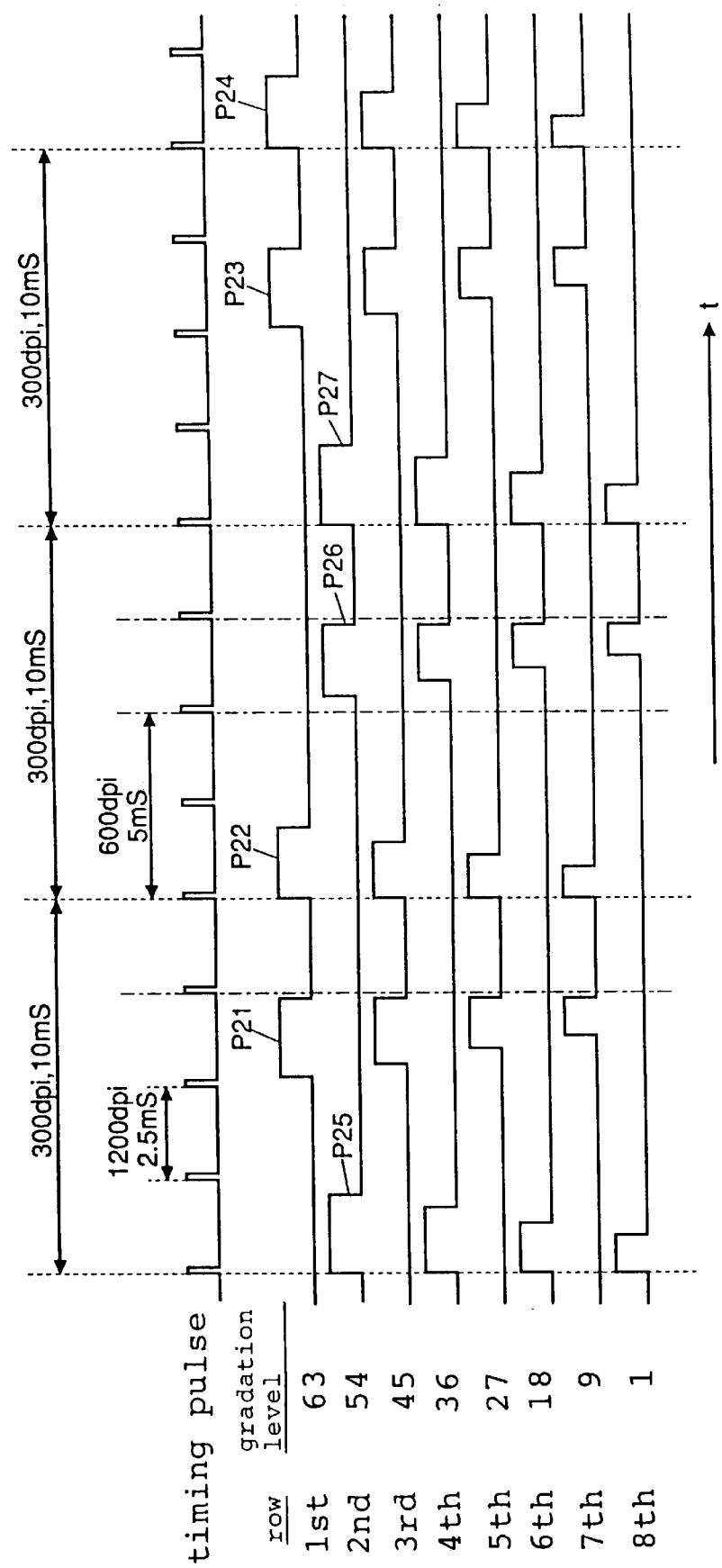
FIG. 14 is a view illustrating another example of pulses that are applied to the transistor of FIG. 6 when forming "C" record dots.

FIG. 14 illustrates another example of the pulses that are applied to the transistor 31 when forming the "C" record dots. The example in this figure is the same as in the case of FIG. 13 in the respect of having the above-mentioned feature (3). Also, while the example in this figure can be said to have basically the above-mentioned features (4) and (5), since the strobing pulse generating portion 36 generates alternately the strobing pulses having the composition A illustrated in FIG. 10A and the strobing pulses having the composition B illustrated in FIG. 10B, the numeric values differ somewhat.

Here, the pulses that are synchronized with the timings that coincide with the reference lines (e.g., pulses P22 and P24 in the 1st row and pulses P25 and P27 in the 2nd row) correspond to the strobing pulses having the composition A and the remaining pulses (e.g., pulses P21 and P23 in the 1st row and a pulse P26 in the 2nd row) have the composition B. Accordingly, in FIG. 14, the interval between the leading edge of the pulse (e.g. P22) synchronized with the timing that coincides with the reference line and the trailing edge of the immediately preceding pulse (e.g. P21) is fixed to 2.5 msec and the intervals between the leading edges become shorter than 5.0 msec as the gradation decreases.

Figure 15:
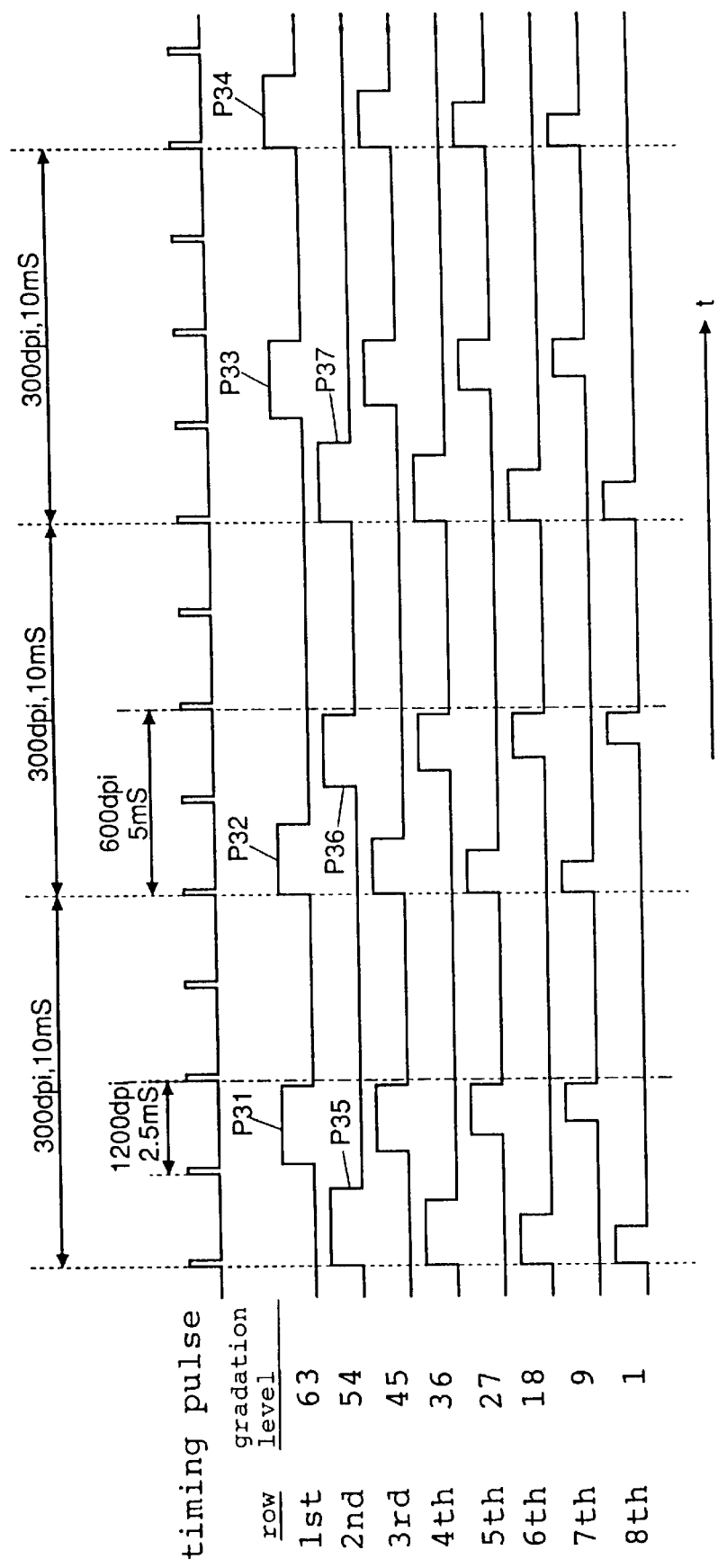
FIG. 15 is a view illustrating still another example of pulses that are applied to the transistor of FIG. 6 when forming "C" record dots.

FIG. 15 illustrates still another example of the pulses that are applied to the transistor 31 when forming the "C" record dots. This pulse current is one wherein the timings of the pulses (P31, P33, P36, etc.) other than the pulses (P32, P34, P35, P37, etc.) synchronized with the timings that coincide with the reference lines in FIG. 13 have been shifted by a time length (=2.5 msec) corresponding to one timing pulse forwardly with respect to the pulses P21, P23, P26, etc. illustrated in FIG. 14.

Figure 16:
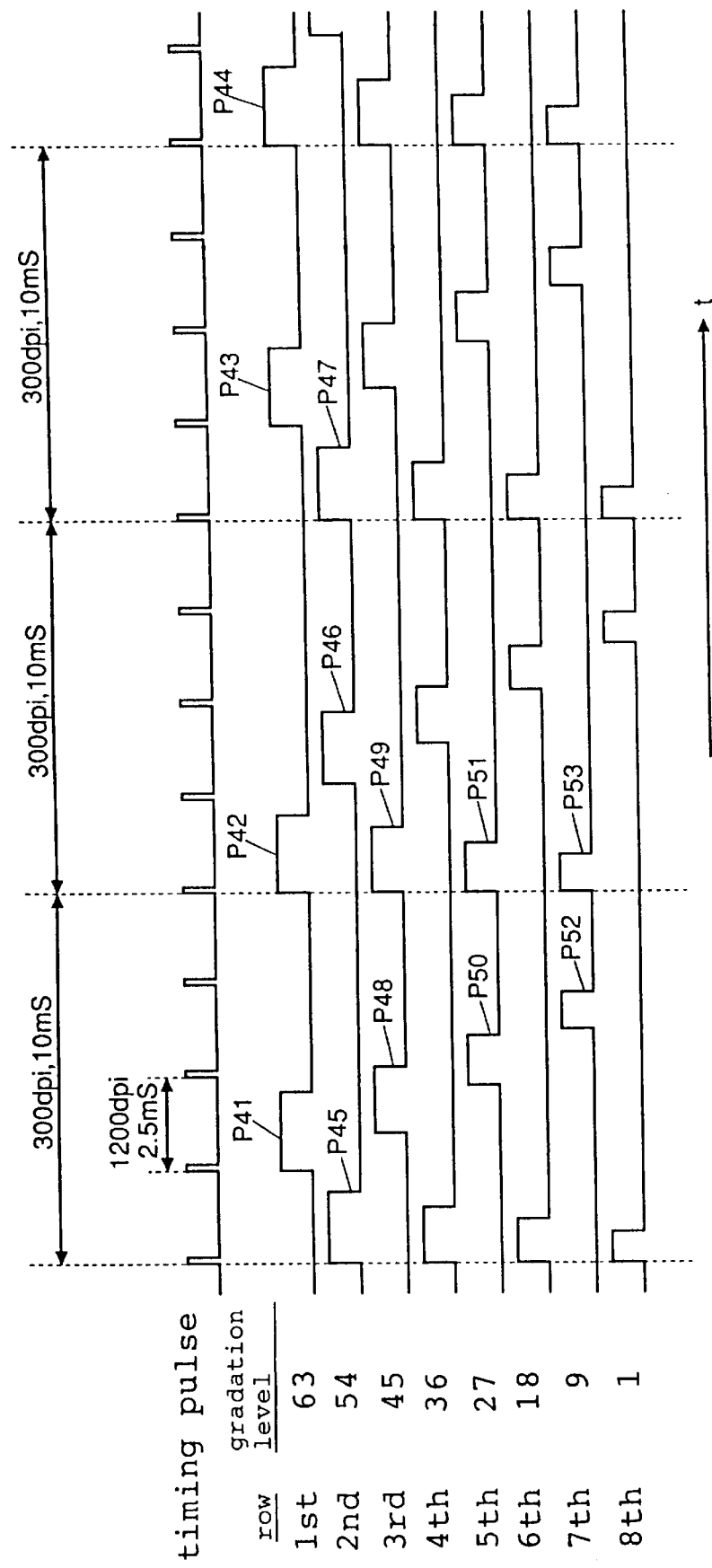
FIG. 16 is a view illustrating another example of pulses that are applied to the transistor of FIG. 6 when forming "C" record dots.

FIG. 16 illustrates another example of the pulses that are applied to the transistor 31 when forming the "C" record dots. In this example, the pulses that are synchronized with the reference lines (P42, P44, P45, P47, P49, P51, P53, etc.) are based on the use of the strobing pulses having the composition A and, as the remaining pulses (P41, P43, P46, P48, P50, P52, etc.), there is used a third-composition strobing pule whose timing largely varies with the level of the gradation. In this case, since both at a time of low gradation and at a time of high gradation the leading edge and trailing edge of each pulse can be freely set, unlike the case of FIGS. 13 to 15 the two record dots that adjoin each other in the sub-scan direction can be constructed being always connected to each other from at a time of high gradation to at a time of low gradation.

Figure 17:
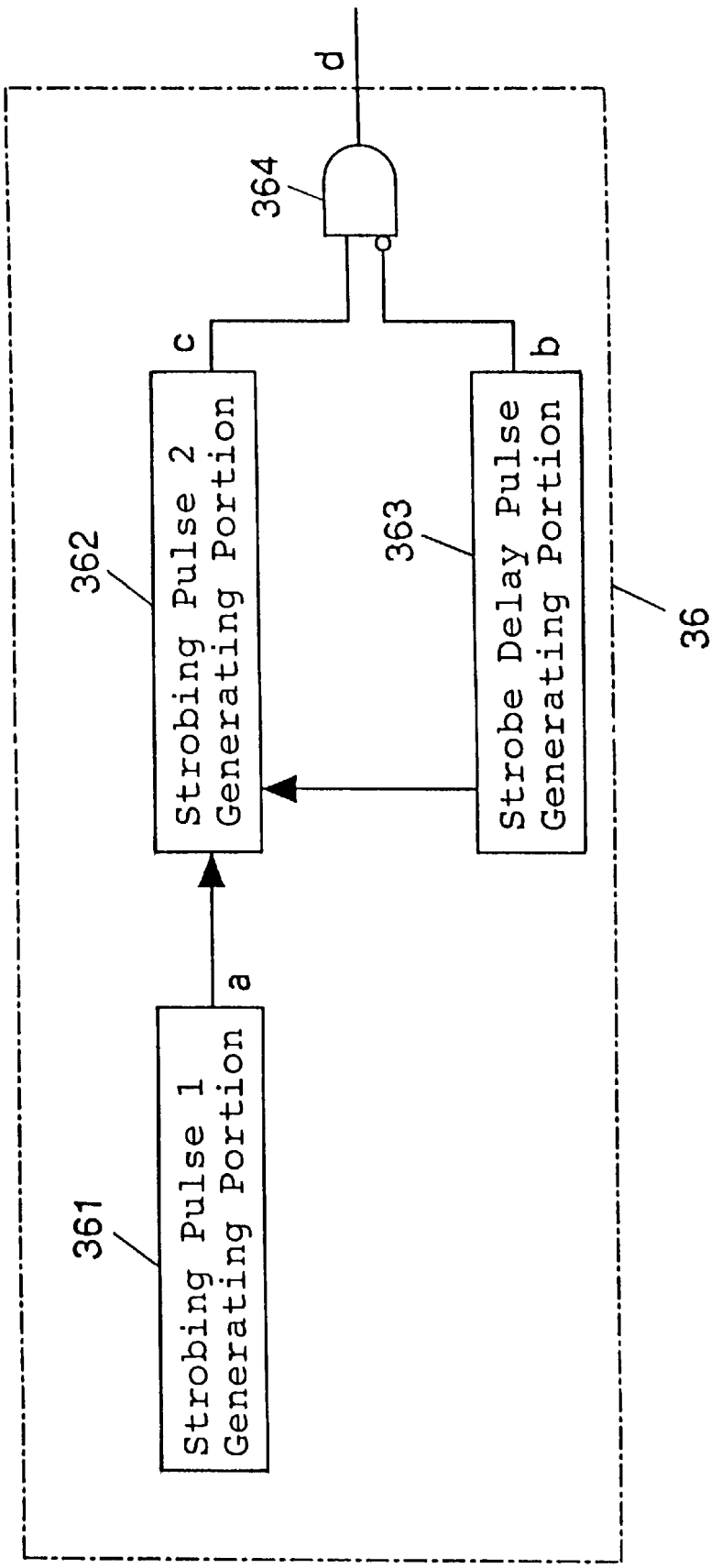
FIG. 17 is a block diagram illustrating a circuit for generating a strobing pulse that is used in the generation of the pulses illustrated in FIG. 16.
Figure 18:
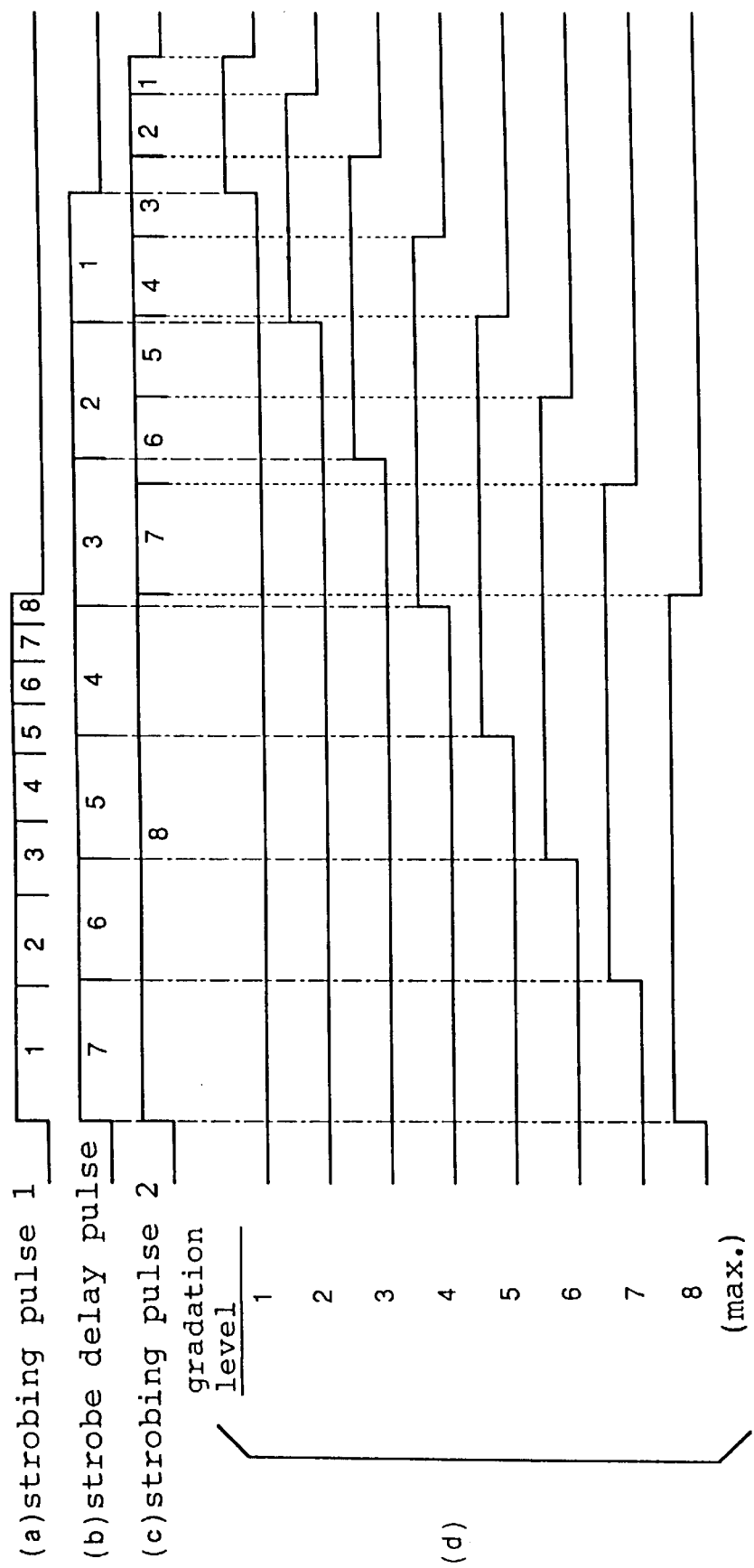
FIG. 18 is a timing chart illustrating the operation of the circuit illustrated in FIG. 17.

FIG. 17 is a block diagram illustrating a circuit for generating the strobing pulses having this third composition and FIG. 18 is a timing chart illustrating the operation thereof, provided, however, that the maximum gradation level is set to be 8 for brevity of the explanation. A strobing pulse 1 generating portion 361 generates a strobing pulse 1 illustrated in FIG. 18(a) and this strobing pulse is one which has the ordinary composition A. A strobe delay pulse generating portion 363 generates a strobe delay pulse illustrated in FIG. 18(b). A strobing pulse 2 generating portion 362 generates a strobing pulse 2 illustrated in FIG. 18(c) by adding the strobing pulse 1 and the strobe delay pulse in terms of the time length. And, by an AND output being obtained by ANDing a pulse prepared by inverting the strobe delay pulse and the strobing pulse 2 in a logic circuit 364, the circuit generates a strobing pulse illustrated in FIG. 18(d). And, by latching the heat data that is stored in the shift register 34 in the latch 33 by synchronizing it with the strobing pulse 2 and generating the strobing pulse illustrated in FIG. 18(d) from the strobing pulse generating portion 36, the current application starting timing can be freely varied in correspondence with the gradation level as illustrated in FIG. 16.

Although the "C" image data printing timing differs according to what one of the printing controls illustrated in FIGS. 13 to 16 is performed, in the case of, for example, FIG. 13 or FIG. 14 the "C" image data is printed in units of 1 line every 5 msec lapse every 42.3 μm conveyance of the transfer paper 25 whereby there are formed the 1-line record dots with 300 dpi such as those illustrated in FIG. 1 from the image data printed every 4 lines. As stated before, the printing of these record dots is the capsule printing. When the capsule printing with 300 dpi has been performed up to the final line whereupon the final-line portion is peeled off, the thermal head 1 is brought to the "up" state and simultaneously the rotation of the ink sheet take-up roller 16 is stopped. Next, by the paper feed rollers 11, 12 and the platen roller 10 being reverse rotated, the transfer paper 25 is returned back to the recording position at which the portion thereof that is 10 lines or so before the print starting line thereof is clamped between the heat generating resistors 2 and the platen roller 10. Also, simultaneously, by the ink sheet take-up roller 16 being rotated, the ink sheet 3 is fed until the ink sheet sensor 20 senses the "K" ink layer on the ink sheet.

And, at a point in time when the "K" ink layer has been sensed, the take-up of the ink sheet is stopped once and then the thermal head 1 is moved down to the position that is illustrated in FIG. 4 and waits for an instruction to start the printing of the "K" image data from the controller not illustrated. Since the sequence of the printing operation for printing the "K" image data and the operation of the thermal head drive control section are the same as in the case of the above-mentioned "M" image data, the explanation thereof is not mage here. When the "K" image data is printed in units of 1 line up to the final line whereupon the final-line portion is peeled off, the thermal head 1 is brought to the "up" state and simultaneously the rotation of the ink sheet take-up roller 16 is stopped. Next, by the paper discharge rollers 13, 14 and the paper feed rollers 11, 12 being rotated, the transfer paper 25 is discharged to the outside of the apparatus, thus the recording of one sheet of color image is ended.

It is to be noted that although in the above-mentioned embodiment "M" and "K" image data are printed by the ordinary zigzag printing and "Y" image data is printed by making the resolution as viewed in the sub-scan direction become a non-integral multiple of the resolution of the "M" and "K" record dots and "C" image data is printed by the capsule printing, the combination of the colors and the dispositions patterns is not limited thereto but may be arbitrary. Also, the sequential order in which "Y", "M", "C" and "K" image data are printed may be also arbitrary. However, if printing is performed in the sequential order of "M"→"C"→"Y"→"K" with a combined form of the colors and disposition pattern illustrated in the embodiment, this exhibits a particularly great effect for suppressing the occurrence of the color moiré. The reason for this is considered to be as follows. When the high-resolution record dots are disposed undermost and the low-resolution record dots are disposed thereon, there is a decreased probability that the low-resolution record dots are disposed at interspace positions between the adjacent high-resolution record dots without largely contacting with the record dots of the color located thereunder, with the result that it is possible to prevent the decrease in the stability of transfer (image quality) that results from the printing performed at the interspace positions. Further, by printing under the "M" and "C" with respect to which the human eye has a high sensitivity and resolving power, the decrease in the stability of transfer (image quality) is made less prominent.

Also, needless to say, the present invention permits performance of printing with three colors of "Y", "M" and "C". Further, although in the above-mentioned embodiment reference has been made to the melt type color thermal transfer printer, the invention can be applied also to a sublimation type color thermal transfer printer, TA (thermo-autochrome) printer, color laser printer and color ink jet printer. Further, although in the above-mentioned embodiment reference has been made to a line printer, the invention can be applied also to a serial printer.

As has been explained in detail, according to the present invention, it is possible to effectively suppress the occurrence of the color moiré in the color image recording apparatus that has been arranged to form record dots of at least three colors. The effect of the present invention is remarkable particularly when expressing the gradation levels by the area of the record dots.

What is claimed is:

1. A method for recording a color image comprising a plurality of record dots of at least three colors formed on a recording medium in a plurality of lines of record dots each extending in a main scan direction and a plurality of rows of record dots each extending in a sub-scan direction, the method comprising the steps of:

forming the record dots of a third color on the recording medium by ordinary zigzag printing;

forming the record dots of a first color on the recording medium so that a disposition pitch thereof as viewed in the sub-scan direction is a non-integer multiple of the disposition pitch of record dots of the third color; and forming the record dots of a second color on the recording medium with a printing pattern in which corresponding record dots of the second color in either one of an odd-numbered line and an adjacent even-numbered line are closer to each other than are adjacent record dots of the second color in either one of an odd-numbered row and an even-numbered row;

such that a disposition pattern of the record dots of the third color is different from those of the first color and the second color.

2. A method for recording a color image according to claim 1; wherein the record dots of the first through third colors are formed by transferring a heat meltable ink of a corresponding color disposed on an ink sheet onto the recording medium through heat that is generated by a heat generating element.

3. A method for recording a color image according to claim 2; wherein the record dots of the one of the three colors which has the highest resolution as viewed in the sub-scan direction are formed earlier in time than the record dots of the other two colors.

4. A method for recording a color image according to claim 1; wherein the record dots in either one of an odd-numbered line and an even-numbered line and the record dots in the other thereof are always connected to each other in at least one of the first through third colors.

5. A method for recording a color image according to claim 2; wherein the record dots in either one of an odd-numbered line and an adjacent even-numbered line and the record dots in the other thereof are always connected to each other in at least one of the first through third colors.

6. A method for recording a color image according to claim 1; wherein the record dots of the one of the first through third colors which has the highest resolution as viewed in the sub-scan direction are formed earlier in time than the record dots of the other two colors.

7. A method for recording a color image according to claim 1; wherein the first through third colors comprise yellow, cyan and magenta, respectively, and the record dots of magenta are formed before the record dots of yellow and cyan.

8. A method for recording a color image according to claim 2; wherein the first through third colors comprise yellow, cyan and magenta, respectively, and the record dots of magenta are formed before the record dots of yellow and cyan.

9. An apparatus for recording a color image by forming record dots of at least three colors on a recording medium in a plurality of lines of record dots each extending in a main scan direction and a plurality of rows of record dots each extending in a sub-scan direction, the apparatus comprising:

a recording element for printing the record dots on the recording medium;

conveying means for conveying the recording medium with respect to the recording element for printing of the record dots on the recording medium;

means for applying energy to the recording element to print an image in accordance with image data; and means for controlling the recording element, the conveying means, and the means for applying energy such that the record dots of a third color are formed on the recording medium by ordinary zigzag printing, the record dots of a first color are formed on the recording medium so that a disposition pitch thereof as viewed in the sub-scan direction is a non-integer multiple of the disposition pitch of the record dots of the third color formed by ordinary zigzag printing, and the record dots of a second color are formed such that a disposition pattern thereof has a printing pattern in which the record dots of the second color in either one of an odd-numbered line and an adjacent even-numbered line are closer to each other than are adjacent record dots of the second color in either one of an odd-numbered row and an even-numbered row, such that a disposition pattern of the record dots of the third color is different from those of the first color and the second color.

10. An apparatus for recording a color image according to claim 9; wherein the recording element comprises a heat generating element for forming the record dots by transferring a heat meltable ink disposed on an ink sheet onto the recording medium through the heat that is generated by the heat generating element.

11. An apparatus for recording a color image according to claim 10; wherein the control means includes means for controlling the means for applying energy to the heat generating element in accordance with image data when forming the record dots of the first color such that a frequency at which the energy is applied to the heat generating element within a time period in which the recording medium is conveyed a prescribed distance with respect to the heat generating element is different from the frequency at which energy is applied to the heat generating element within the same time period during ordinary zigzag printing of the first color according to a value that corresponds to the non-integer multiple.

12. In a melt type color thermal transfer recording apparatus in which the record dots of at least three colors are formed on a recording medium by a heat generating element in a plurality of lines of record dots each extending in a main scan direction and a plurality of rows of record dots each extending in a sub-scan direction, a method for controlling recording of a color image by providing a disposition pattern of the record dots of at least one color that is different from the disposition pattern of the record dots of at least one of the other colors, comprising the steps of:

forming the record dots of a first one of the at least three colors by ordinary zigzag printing; and forming the record dots of another one of the at least three colors by shifting the timing at which the heat generating element is energized for forming the record dots of the first color within a time period in which the recording medium is conveyed with respect to the heat generating element by an extent corresponding to one line, such that the record dots of the other color are formed having corresponding record dots in either one of an odd-numbered line and an adjacent even-numbered line which are closer to each other than are adjacent record dots in either one of an odd-numbered row and an even-numbered row.

13. In a melt type color thermal transfer recording apparatus in which the record dots of at least three colors are formed on a recording medium by a heat generating element in a plurality of lines of record dots each extending in a main scan direction and a plurality of rows of record dots each extending in a sub-scan direction, a method for controlling recording of a color image by providing a disposition pattern of the record dots of at least one color that is different from the disposition pattern of the record dots of at least one of the other colors, comprising the steps of:

forming the record dots of a first one of the at least three colors by ordinary zigzag printing; and forming the record dots of another one of the at least three colors by setting a frequency at which the heat generating element is energized within a time period in which the recording medium is conveyed with respect to the heat generating element by a prescribed distance to be different from the frequency which is set when the ordinary zigzag printing is performed, such that the record dots of the other color are formed having a disposition pitch as viewed in the sub-scan direction which is a non-integral multiple of the disposition pitch of the record dots formed by the ordinary zigzag printing.

14. A method for recording a color image comprising record dots of at least first through third colors formed on a recording medium in a plurality of lines of record dots each extending in a main scan direction and a plurality of rows of record dots each extending in a sub-scan direction, the method comprising the steps of:

forming a plurality of lines of record dots of the third color on the recording medium with a first disposition pitch between record dots of the third color in adjacent lines such that record dots of the third color of each line are shifted in the sub-scan direction by a predetermined amount;

forming a plurality of lines of record dots of the second color on the recording medium such that the record dots of the second color in either one of an odd-numbered line and an adjacent even-numbered line are closer to each other than record dots of the second color in either one of an odd-numbered row and an even-numbered row; and forming a plurality of lines of record dots of the first color on the recording medium with a second disposition pitch between record dots of the first color in adjacent lines which is a non-integer multiple of the first disposition pitch.

15. A method for recording a color image according to claim 14; wherein the record dots of the third color are formed with the same disposition pitch between respective lines of record dots of the third color and between respective rows of record dots of the third color.

16. A method for recording a color image according to claim 14; wherein the first disposition pitch is 84.7 $\mu$m.

17. A method for recording a color image according to claim 16; wherein a plurality of the record dots of each line of the third color are shifted in the sub-scan direction by 42.3 $\mu$m.

18. A method for recording a color image according to claim 14; wherein a plurality of the record dots of each line of the third color are shifted in the sub-scan direction by ½ the first disposition pitch.

19. A method for recording a color image according to claim 14; wherein the record dots of each line of the third color that are shifted in the sub-scan direction comprise every other record dot of the third color in each line.

20. A method for recording a color image according to claim 14; wherein record dots of each line of the first color are shifted in the sub-scan direction by a predetermined amount.

21. A method for recording a color image according to claim 20; wherein the record dots of each line of the first color that are shifted in the sub-scan direction comprise alternating pairs of adjacent record dots of the first color.

22. A method for recording a color image according to claim 14; wherein the record dots of the first through third colors are formed by transferring a heat meltable ink of a corresponding color disposed on an ink sheet onto the recording medium through heat that is generated by a heat generating element.

23. A method for recording a color image according to claim 14; wherein the record dots of at least one of the first through third colors in either one of an odd-numbered line and an even-numbered line and adjacent record dots in the other one of the odd-numbered line and even-numbered line are always connected to each other.

24. A method for recording a color image according to claim 14; wherein the record dots of the one of the first through third colors which has the highest resolution as viewed in the sub-scan direction are formed earlier in time than the record dots of the other two colors.

25. A method for recording a color image according to claim 14; wherein the first through third colors comprise yellow, cyan and magenta, respectively, and the record dots of magenta are formed before the record dots of yellow and cyan.

26. An apparatus for recording a color image by forming record dots of at least first through third colors on a recording medium in a plurality of lines of record dots each extending in a main scan direction and a plurality of rows of record dots each extending in a sub-scan direction, the apparatus comprising: a recording element for printing the record dots on the recording medium; conveying means for conveying the recording medium with respect to the recording element for printing of the record dots on the recording medium; means for applying energy to the recording element to print an image in accordance with image data; and means for controlling the recording element, the conveying means and the means for applying energy such that the record dots of the third color are formed on the recording medium with a first disposition pitch between lines such that selected ones of the record dots of each line are shifted in the sub-scan direction by a predetermined amount, the record dots of the second color are formed on the recording medium such that corresponding record dots in either one of an odd-numbered line and an adjacent even-numbered line are closer to each other than are adjacent record dots in either one of an odd-numbered row and an even-numbered row, and the record dots of the first color are formed on the recording medium with a second disposition pitch between lines which is a non-integer multiple of the first disposition pitch.

27. An apparatus for recording a color image according to claim 26; wherein the recording element comprises a heat generating element for forming the record dots by transferring a heat-meltable ink disposed on an ink sheet onto the recording medium through heat that is generated by the heat generating element.

28. An apparatus for recording a color image according to claim 27; wherein the controlling means includes means for controlling the means for applying energy to the heat generating element in accordance with image data, when forming the record dots of the first color having the second disposition pitch, such that a frequency at which the energy is applied to the heat generating element is different from the frequency at which the energy is applied when printing record dots having the first disposition pitch according to a value that corresponds to the non-integer multiple.

29. An apparatus for recording a color image according to claim 26; wherein the recording element comprises a thermal head having a plurality of heat generating elements arranged in a line in the main scan direction for printing a line of record dots.

30. An apparatus for recording a color image according to claim 29; further comprising a platen roller disposed opposite the thermal head so as to urge the recording medium and an ink sheet therebetween.

31. An apparatus for recording a color image according to claim 30; wherein one of the thermal head and platen roller is relatively movable with respect to the other so as to selectively press together the ink sheet and the recording medium against the thermal head.

32. An apparatus for recording a color image according to claim 31; further comprising feed rollers for feeding the recording medium; and means for selectively driving the platen roller and the feed rollers together in clockwise and counterclockwise directions so as to feed the recording medium in forward and reverse directions.

33. An apparatus for recording a color image according to claim 32; further comprising supply means for supplying a blank recording medium to the platen roller and discharge means for discharging the recording medium after recording of the image thereon.

34. An apparatus for recording a color image according to claim 33; further comprising an ink sheet supply roller for maintaining a roll of ink sheet material and an ink sheet take-up roller for taking up a used portion of the ink sheet.

35. An apparatus for recording a color image according to claim 34; further comprising a peel plate for peeling the ink sheet from the recording medium after thermal transfer has been made.

36. An apparatus for recording a color image according to claim 26; wherein the recording element comprises a recording head having a plurality of printing elements; and wherein the control means comprises an image signal interface portion for receiving color image data from a host computer and converting the color image data to a predefined format, a frame memory for storing the color image data in the predefined format, a resolution converting portion for reading out the color image data from the frame memory and converting the resolution of the color image data to a resolution determined based upon the color of the image data, a dither processing portion for superposing a dither matrix onto the image data output by the resolution converting portion so as to obtain image data with a predetermined number of gradations, a mask processing portion for performing mask processing on the image data output by the dither processing portion, a line memory for storing image data for at least one line of record dots to be printed according to the output of the mask processing portion, a data generating portion for generating data used for driving the individual printing elements of the recording head based upon the data stored in the line memory, and a strobing pulse generating portion for generating pulses having a pulse width determined based upon the gradation of the image data stored in the line memory.

37. An apparatus for recording a color image by forming record dots of at least first through third colors on a recording medium in a plurality of lines of record dots each extending in a main scan direction and a plurality of rows of record dots each extending in a sub-scan direction, the apparatus comprising: a recording head for printing the record dots on the recording medium; conveying means for conveying the recording medium with respect to the recording element for printing of the record dots on the recording medium; means for applying energy to the recording element to print an image in accordance with image data; and means for controlling the recording element, the conveying means and the means for applying energy such that the record dots of first through third colors are each formed with a different disposition pattern effective to avoid the occurrence of color moiré.

38. An apparatus for recording a color image according to claim 37; wherein the disposition pattern of the record dots of one of the three colors comprises an ordinary zigzag printing pattern in which selected ones of the record dots in each line of record dots are shifted in the sub-scan direction by a uniform amount, the disposition pattern of the record dots of another one of the three colors comprises a modified ordinary zigzag pattern in which a dot pitch between lines of record dots in the sub-scan direction is a non-integer multiple of the dot pitch of the ordinary zigzag printing pattern, and the disposition pattern of the remaining one of the three colors comprises a modified ordinary zigzag pattern in which corresponding record dots in adjacent lines of record dots are closer to each other than are the record dots in adjacent rows.

* * * * *